US010791334B2

(12) United States Patent
Matsuoka

(10) Patent No.: US 10,791,334 B2
(45) Date of Patent: Sep. 29, 2020

(54) IMAGE PROCESSING APPARATUS AND IMAGE PROCESSING METHOD

(71) Applicant: CANON KABUSHIKI KAISHA, Tokyo (JP)

(72) Inventor: Masaaki Matsuoka, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 125 days.

(21) Appl. No.: 16/178,812

(22) Filed: Nov. 2, 2018

(65) Prior Publication Data

US 2019/0141342 A1    May 9, 2019

(30) Foreign Application Priority Data

Nov. 6, 2017   (JP) ................................. 2017-214187
Oct. 19, 2018  (JP) ................................. 2018-197848

(51) Int. Cl.
| | |
|---|---|
| *H04N 19/169* | (2014.01) |
| *H04N 19/63* | (2014.01) |
| *H04N 19/186* | (2014.01) |
| *H04N 13/282* | (2018.01) |
| *H04N 19/597* | (2014.01) |
| *H04N 13/128* | (2018.01) |
| *H04N 13/31* | (2018.01) |

(52) U.S. Cl.
CPC ....... *H04N 19/1883* (2014.11); *H04N 13/128* (2018.05); *H04N 13/282* (2018.05); *H04N 13/31* (2018.05); *H04N 19/186* (2014.11); *H04N 19/597* (2014.11); *H04N 19/63* (2014.11)

(58) Field of Classification Search
CPC ............ H04N 19/1883; H04N 19/597; H04N 19/186; H04N 19/63; H04N 13/31; H04N 13/128; H04N 13/282; H04N 13/106; H04N 13/218
USPC .................................................... 375/240.19
See application file for complete search history.

(56) References Cited

U.S. PATENT DOCUMENTS

| | | | | |
|---|---|---|---|---|
| 2011/0064327 A1* | 3/2011 | Dagher | ................... | G06T 5/004 |
| | | | | 382/263 |
| 2016/0119637 A1* | 4/2016 | Eslami | ................ | H04N 19/186 |
| | | | | 375/240.19 |

FOREIGN PATENT DOCUMENTS

JP    2015-171097 A    9/2015

* cited by examiner

*Primary Examiner* — Allen C Wong
(74) *Attorney, Agent, or Firm* — Cowan, Liebowitz & Latman, P.C.

(57) ABSTRACT

An image processing apparatus divides a plurality of difference images that are based on addition and subtraction between a plurality of parallax images, and a composite image that is based on addition between a plurality of parallax images, into a plurality of sub-bands including a sub-band that includes high-frequency components and a sub-band that does not include high-frequency components. When encoding the plurality of difference images and the composite image, as for the plurality of difference images, the image processing apparatus encodes data of the sub-band that includes high-frequency components, and, as for the composite image, the image processing apparatus encodes data of the plurality of sub-bands.

30 Claims, 21 Drawing Sheets

DECOMPOSITION LEVEL 0

701

DECOMPOSITION LEVEL 1

702

DECOMPOSITION LEVEL 2

703

DECOMPOSITION LEVEL 3

704

$$Df = \frac{r \cdot Av \cdot Z^2}{f^2 + r \cdot Av \cdot Z}$$

$$Db = \frac{r \cdot Av \cdot Z^2}{f^2 - r \cdot Av \cdot Z}$$

$$D = D_f + D_b$$

Df = FRONT DEPTH OF FIELD
Db = BACK DEPTH OF FIELD
D = DEPTH OF FIELD
r = PERMISSIBLE DIAMETER OF CIRCLE OF CONFUSION
Av = APERTURE VALUE
Z = DISTANCE TO SUBJECT
f = FOCAL LENGTH

IMAGE PROCESSING APPARATUS AND IMAGE PROCESSING METHOD

BACKGROUND OF THE INVENTION

Field of the Invention

The present invention relates to an image processing apparatus and an image processing method, and relates particularly to an image processing technique associated with multi-viewpoint images.

Description of the Related Art

Images (multi-viewpoint images) that are obtained by capturing images of the same subject from a plurality of viewpoints, such as those obtained through stereoscopic photographing or multi-angle photographing, are used to provide stereoscopic vision or to generate an image from a changed viewpoint or in-focus distance, for example. Since multi-viewpoint images are a group of images with the same number of frames as that of viewpoints, the amount of data thereof also increases with an increase in the number of viewpoints.

Japanese Patent Laid-Open No. 2015-171097 discloses that, instead of transmitting all data of a plurality of images (sub-images) that constitute multi-viewpoint images, data of an image obtained by calculating an arithmetic average of the sub-images and data of a region of interest (ROI) within each of the sub-images are transmitted.

The technique disclosed in Japanese Patent Laid-Open No. 2015-171097 can realize refocusing in the ROI while reducing the amount of data to be transmitted. However, the image region that can be subjected to refocusing is limited to the ROI.

SUMMARY OF THE INVENTION

The present invention provides a technique for reducing the amount of data of multi-viewpoint images while ensuring flexibility in image processing using the multi-viewpoint images.

According to an aspect of the present invention, there is provided an image processing apparatus comprising: a processor that executes a program stored in a memory and functions as: a dividing unit configured to divide a plurality of difference images that are based on addition and subtraction between a plurality of parallax images, and a composite image that is based on addition of the plurality of parallax images, into a plurality of sub-bands including a sub-band that includes high-frequency components and a sub-band that does not include high-frequency components; and an encoding unit configured to encode the plurality of difference images and the composite image, wherein, as for the plurality of difference images, the encoding unit encodes data of the sub-band that includes high-frequency components, and, as for the composite image, the encoding unit encodes data of the plurality of sub-bands.

According to another aspect of the present invention, there is provided an image processing apparatus comprising: a processor that executes a program stored in a memory and functions as: a converting unit configured to convert, to a luminance component and a color difference component, a plurality of difference images that are based on addition and subtraction between a plurality of parallax images, and a composite image that is based on addition of the plurality of parallax images; a dividing unit configured to divide the luminance component and the color difference component into a plurality of sub-bands including a sub-band that includes high-frequency components and a sub-band that does not include high-frequency components; and an encoding unit configured to encode the plurality of difference images and the composite image, wherein, as for the composite image, the encoding unit encodes data of the plurality of sub-bands of both the luminance component and the color difference component, and as for the plurality of difference images, the encoding unit does not encode the color difference component, and encodes data of the sub-band that include high-frequency components of the luminance component.

According to a further aspect of the present invention, there is provided an image processing apparatus comprising: a processor that executes a program stored in a memory and functions as: an acquisition unit configured to acquire encoded data of a plurality of sub-bands of a composite image that is based on addition between a plurality of parallax images, and encoded data of a sub-band that includes high-frequency components, out of the plurality of sub-bands, of each of a plurality of difference images that are based on addition and subtraction between the plurality of parallax images: a generating unit configured to generate a refocused image using the plurality of parallax images that have been restored using the encoded data of the plurality of difference images; and an addition unit configured to add the refocused image to the composite image that has been restored using the encoded data of the composite image.

According to another aspect of the present invention, there is provided an image processing apparatus comprising: a processor that executes a program stored in a memory and functions as: an acquisition unit configured to acquire encoded data of a plurality of sub-bands of a composite image that is based on addition between a plurality of parallax images, and encoded data of a sub-band that includes high-frequency components, out of the plurality of sub-bands, of each of a plurality of difference images that are based on addition and subtraction between the plurality of parallax images: a shift-and-add operation unit configured to perform, for each sub-band, a shift-and-add operation on data of sub-bands of the plurality of parallax images that are obtained from the encoded data of the plurality of difference images: and a restoration unit configured to restore an image using data of the sub-bands that has been subjected to the shift-and-add operation and data of the sub-bands obtained from the encoded data of the composite image.

According to a further aspect of the present invention, there is provided an image capture apparatus comprising: an image sensor that receives a light beam from an optical system and outputs a plurality of parallax images; an image processing apparatus that applies encoding process to the plurality of parallax images output from the image sensor to generates encoded data; and a recording unit configured to record, to a memory, the encoded data that has been generated by the image processing apparatus, the image processing apparatus comprising: a processor that executes a program stored in a memory and functions as: a dividing unit configured to divide a plurality of difference images that are based on addition and subtraction between the plurality of parallax images, and a composite image that is based on addition of the plurality of parallax images, into a plurality of sub-bands including a sub-band that includes high-frequency components and a sub-band that does not include high-frequency components; and an encoding unit configured to encode the plurality of difference images and the composite image, wherein, as for the plurality of difference images, the encoding unit encodes data of the sub-band that includes high-frequency components, and, as for the composite image, the encoding unit encodes data of the plurality of sub-bands.

According to another aspect of the present invention, there is provided an image capture apparatus comprising: an image sensor that receives a light beam from an optical system and outputs a plurality of parallax images; an image processing apparatus that applies an encoding process to the plurality of parallax images to generate encoded data; and a recording unit configured to record, to a memory, the encoded data that has been generated by the image processing apparatus, the image processing apparatus comprising: a processor that executes a program stored in a memory and functions as: a converting unit configured to convert, to a luminance component and a color difference component, a plurality of difference images that are based on addition and subtraction between the plurality of parallax images, and a composite image that is based on addition of the plurality of parallax images; a dividing unit configured to divide the luminance component and the color difference component into a plurality of sub-bands that include a sub-band including high-frequency components and a sub-band that does not include high-frequency components; and an encoding unit configured to encode the plurality of difference images and the composite image, wherein, as for the composite image, the encoding unit encodes data of the plurality of sub-bands of both the luminance component and the color difference component, and as for the plurality of difference images, the encoding unit does not encode the color difference component, and encodes data of the sub-band that includes high-frequency components of the luminance component.

According to a further aspect of the present invention, there is provided an image sensor comprising: a first semiconductor substrate comprising a plurality of photoelectric conversion units that receive a light beam from an optical system and output a plurality of parallax images; and a second semiconductor substrate comprising the image processing apparatus comprising: a processor that executes a program stored in a memory and functions as: a dividing unit configured to divide a plurality of difference images that are based on addition and subtraction between a plurality of parallax images, and a composite image that is based on addition of the plurality of parallax images, into a plurality of sub-bands including a sub-band that includes high-frequency components and a sub-band that does not include high-frequency components; and an encoding unit configured to encode the plurality of difference images and the composite image, wherein, as for the plurality of difference images, the encoding unit encodes data of the sub-band that includes high-frequency components, and, as for the composite image, the encoding unit encodes data of the plurality of sub-bands, and wherein the first semiconductor substrate and the second semiconductor substrate being stacked together.

According to another aspect of the present invention, there is provided an image processing method to be performed by an image processing apparatus, the method comprising: dividing a plurality of difference images that are based on addition and subtraction between a plurality of parallax images, and a composite image that is based on addition of the plurality of parallax images, into a plurality of sub-bands including a sub-band that includes high-frequency components and a sub-band that does not include high-frequency components; and encoding the plurality of difference images and the composite image, wherein, during the encoding, as for the plurality of difference images, data of the sub-band that includes high-frequency components is encoded, and, as for the composite image, data of the plurality of sub-bands is encoded.

According to a further aspect of the present invention, there is provided an image processing method to be performed by an image processing apparatus, the method comprising: converting, to a luminance component and a color difference component, a plurality of difference images that are based on addition and subtraction between a plurality of parallax images, and a composite image that is based on addition of the plurality of parallax images; dividing the luminance component and the color difference component into a plurality of sub-bands including a sub-band that includes high-frequency components and a sub-band that does not include high-frequency components, and encoding the plurality of difference images and the composite image, wherein, during the encoding, as for the composite image, data of the plurality of sub-bands of both the luminance component and the color difference component is encoded, and as for the plurality of difference images, the color difference component is not encoded, and data of the sub-band that includes high-frequency components of the luminance component is encoded.

According to another aspect of the present invention, there is provided an image processing method to be performed by an image processing apparatus, the method comprising: acquiring encoded data of a plurality of sub-bands of a composite image that is based on addition between a plurality of parallax images, and encoded data of a sub-band that includes high-frequency components, out of the plurality of sub-bands, of each of a plurality of difference images that are based on addition and subtraction between the plurality of parallax images; generating a refocused image using the plurality of parallax images that have been restored using the encoded data of the plurality of difference images; and adding the refocused image to the composite image that has been restored using the encoded data of the composite image.

According to a further aspect of the present invention, there is provided an image processing method to be performed by an image processing apparatus, the method comprising: acquiring encoded data of a plurality of sub-bands of a composite image that is based on addition between a plurality of parallax images, and encoded data of a sub-band that includes high-frequency components, out of the plurality of sub-bands, of each of a plurality of difference images that are based on addition and subtraction between the plurality of parallax images; generating data of sub-bands of the plurality of parallax images, using the encoded data of the plurality of difference images; performing, for each sub-band, a shift-and-add operation on data of the sub-bands obtained from the encoded data of the composite image; and restoring an image using the data of the sub-bands that have been subjected to the shift-and-add operation and the data of the sub-bands that are obtained from the encoded data of the composite image.

According to another aspect of the present invention, there is provided a non-transitory computer-readable medium storing a command that can be executed by a computer, the command, upon being executed by the computer, causing the computer to function as an image processing apparatus comprising: a dividing unit configured to divide a plurality of difference images that are based on addition and subtraction between a plurality of parallax images, and a composite image that is based on addition of the plurality of parallax images, into a plurality of sub-bands including a sub-band that includes high-frequency components and a sub-band that does not include high-frequency components; and an encoding unit configured to encode the plurality of difference images and the composite image, wherein, as for the encoding unit, the encoding unit encodes data of the sub-band that includes high-frequency components, and, as for the composite image, the encoding unit encodes data of the plurality of sub-bands.

According to a further aspect of the present invention, there is provided a non-transitory computer-readable medium storing a command that can be executed by a computer, the command, upon being executed by the computer, causing the computer to function as an image processing apparatus comprising: a converting unit configured to convert, to a luminance component and a color difference component, a plurality of difference images that are based on addition and subtraction between a plurality of parallax images, and a composite image that is based on addition of the plurality of parallax images; a dividing unit configured to divide the luminance component and the color difference component into a plurality of sub-bands including a sub-band that includes high-frequency components and a sub-band that does not include high-frequency components; and an encoding unit configured to encode the plurality of difference images and the composite image, wherein, as for the composite image, the encoding unit encodes data of the plurality of sub-bands of both the luminance component and the color difference component, and as for the plurality of difference image, the encoding unit does not encode the color difference component, and encodes data of the sub-band that includes high-frequency components of the luminance component.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanying drawings. Note that the present invention is not limited to the embodiments described below. Also, not all of the constituent elements described in the embodiments are necessarily essential for the present invention. Each functional block in the embodiments can be realized with hardware, such as a programmable logic device or a circuit component, or software that can be executed by a programmable processor, or a combination of such hardware and software. One functional block may be realized with a plurality of pieces of hardware. Also, one piece of hardware may realize a plurality of functional blocks. One or more functional blocks may be realized by one or more programmable processors (CPUs, MPUs etc.) executing a computer program that is loaded to a memory.

Hereinafter, embodiments in which the present invention is applied to a digital camera, which serves as an example of an image processing apparatus, will be described. However, the present invention is applicable to any electronic device capable of handling multi-viewpoint images. Such electronic devices include image capture apparatuses, information processing apparatuses such as a computer, a smartphone, a tablet terminal, or a game machine, appliances, robots, and the like, but are not limited thereto.

First Embodiment

Figure 1:
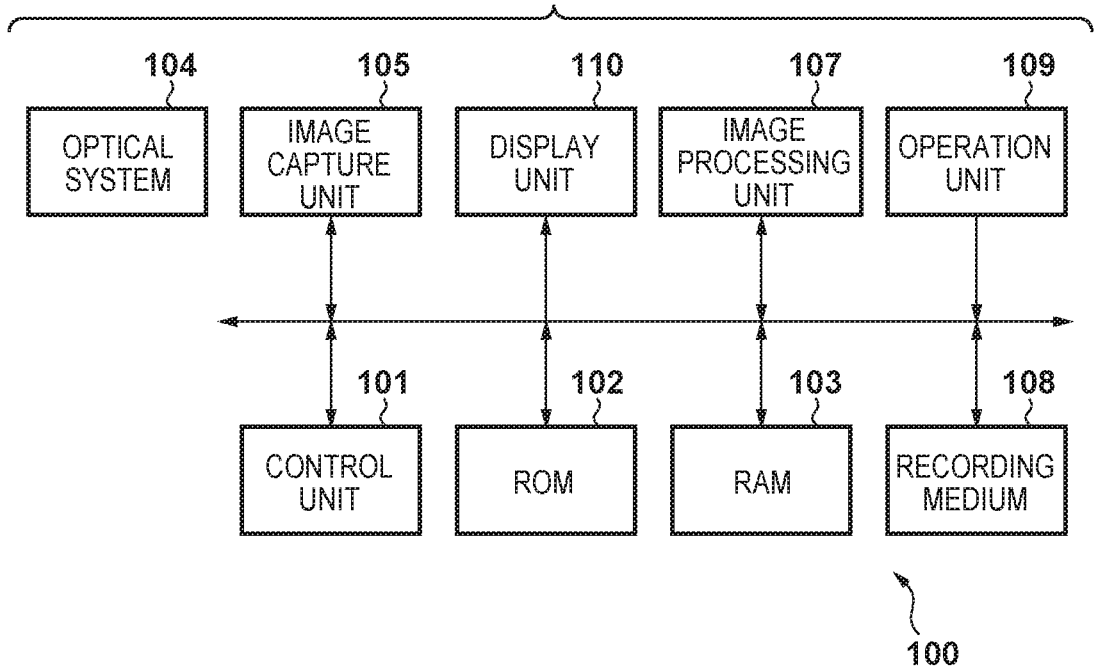
FIG. 1 is a block diagram illustrating a functional configuration of a digital camera, which serves as an example of an image processing apparatus according to an embodiment.

FIG. 1 is a block diagram illustrating a functional configuration example of a digital camera 100 according to this embodiment. A control unit 101 is constituted by one or more programmable processors (CPUs, MPUs), for example. The control unit 101 controls operations of functional blocks of the digital camera 100 by loading a program stored in a ROM 102 to a RAM 103 and executing it, for example, and realizes functions of the digital camera 100.

The ROM 102 is a rewritable, nonvolatile memory, and stores not only programs that can be executed by the control unit 101, but also various set values, GUI data, and so on.

The RAM 103 is a rewritable, volatile memory, and is used as a system memory to execute programs, or as a temporary data storage area (buffer memory).

An optical system 104 includes a plurality of lenses, a diaphragm, and so on, and forms an optical image of a subject on an imaging plane of an image capture unit 105. The optical system 104 may be or may not be removable. The optical system 104 includes movable lenses, such as a focusing lens, a zoom lens, and a shake correction lens, as well as a mechanism for driving the movable lenses.

The image capture unit 105 includes a pixel unit and peripheral circuits (e.g. readout circuit, A/D converter, encoding circuit etc.). As will be described later, the image capture unit 105 according to this embodiment performs two-dimensional sub-band encoding on image data, and primarily stores the results in the RAM 103.

An image processing unit 107 decodes encoded data stored in the RAM 103, and applies various kinds of image processing, such as white balance adjustment, color interpolation, reduction/enlargement, and filtering, to the image data obtained as a result of the decoding. The image processing unit 107 is implemented by an ASIC in general, but processing thereof may be partially realized by the control unit 101 executing a program. The image processing unit 107 again stores the image data that has been subjected to processing, in the RAM 103. Note that the image processing unit 107 may also perform processing to acquire, from image data, information to be used in automatic focus detection (AF) and automatic exposure control (AE).

The control unit 101 generates an image file using the encoded data output by the image capture unit 105 or the image data that has been processed by the image processing unit 107, and records the generated image file to a recording medium 108. Processing that the image processing unit 107 applies to image data and the configuration of the image file generated by the control unit 101 are predetermined in accordance with a recording format. The recording medium 108 is a removable memory card, for example.

An operation unit 109 is a generic name of input devices for a user to give instructions to the digital camera 100. A shutter button, a moving image capture/pause button, a power button, a menu button, a direction key, a set button, and so on, are included in the operation unit 109. The control unit 101 monitors operations made to the operation unit 109, and performs an operation in accordance with a detected operation.

A display unit 110 is an LCD or an OLED, for example, and displays various kinds of information regarding the digital camera 100, captured images, and GUIs (menu screen etc.). The display unit 110 may also be a touch panel display, and in this case, the touch panel is included in the operation unit 109.

Figure 2A:
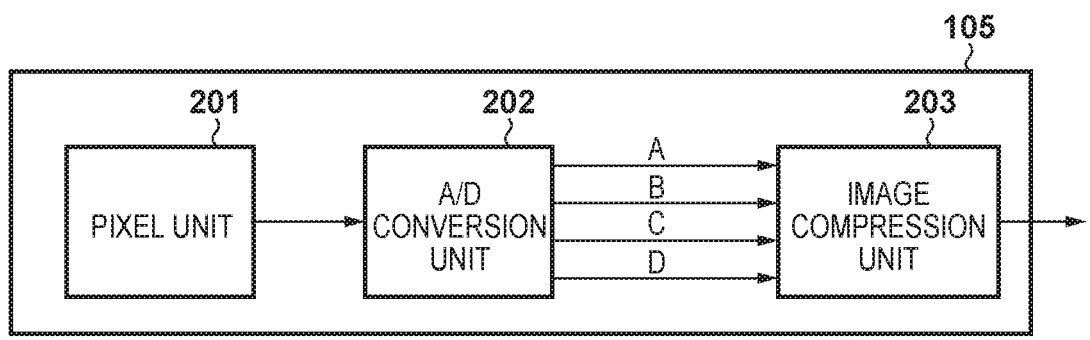
FIGS. 2A to 2C relate to an image capture unit of the digital camera according to the embodiment.
Figure 2B:
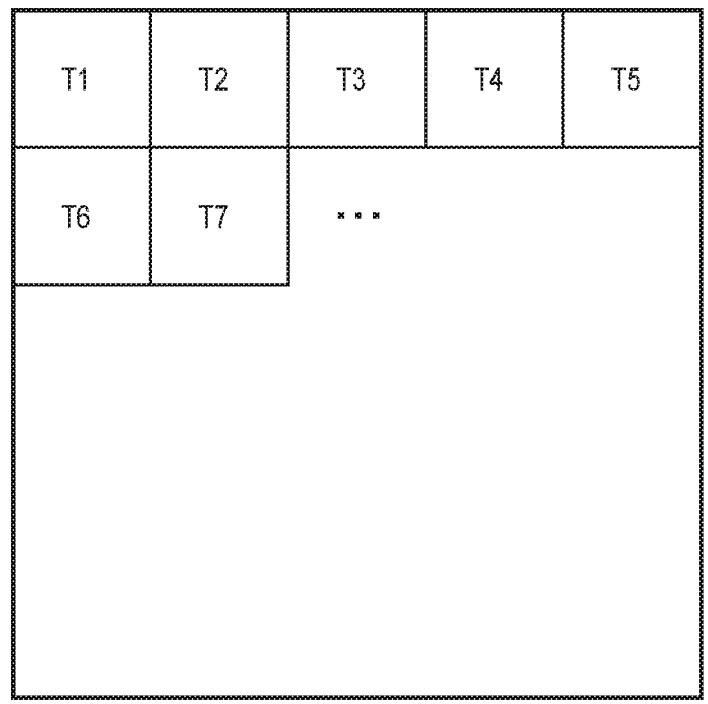

FIG. 2A is a block diagram illustrating a functional configuration example of the image capture unit 105. A pixel unit 201 converts an optical image to an analog image signal, and outputs it to the A/D conversion unit 202. The A/D conversion unit 202 performs A/D conversion on the analog image signal, and outputs it as image data to an image compression unit 203. To reduce the size of a line buffer in the image compression unit 203, the image data is output in units of tiles (T1, T2, T3, . . . ), such as those shown in FIG. 2B. The image compression unit 203 performs two-dimensional sub-band division on an image, and encodes components in a specific band.

In this embodiment, the image capture unit 105 is constituted by one chip in which the pixel unit 201, which is formed in a first layer (first semiconductor substrate), and the image compression unit 203, which is formed in a second layer (second semiconductor substrate), are stacked together, and are electrically connected to each other by at least one through-hole via. The image compression unit 203 is thus embedded in the chip in this embodiment for the purpose of power-saving, high-speed processing, and low-cost design. If the pixel unit 201 is arranged on a substrate within the chip, and the image compression unit 203 is arranged on a substrate outside the chip, there will be more resistance components and capacitance components in the wiring. As a result, the speed of communication therebetween is lower than that in communication using an interconnect within the same chip. To achieve high-speed communication, those units need to be driven by an amplifier to keep signal waveform quality, and driving power needs to be increased. In contrast, by arranging both the pixel unit 201 and the image compression unit 203 on the semiconductor substrates within the same chip, an output interconnect can be made short, and the amplifier can also be omitted. In addition, since the amount of encoded data output from the image capture unit 105 is small, the time taken for communication between the image capture unit 105, the control unit 101, and the image processing unit 107 is shortened, making it possible to increase the processing speed, reduce the processing load, and also reduce power consumption.

Figure 2C:
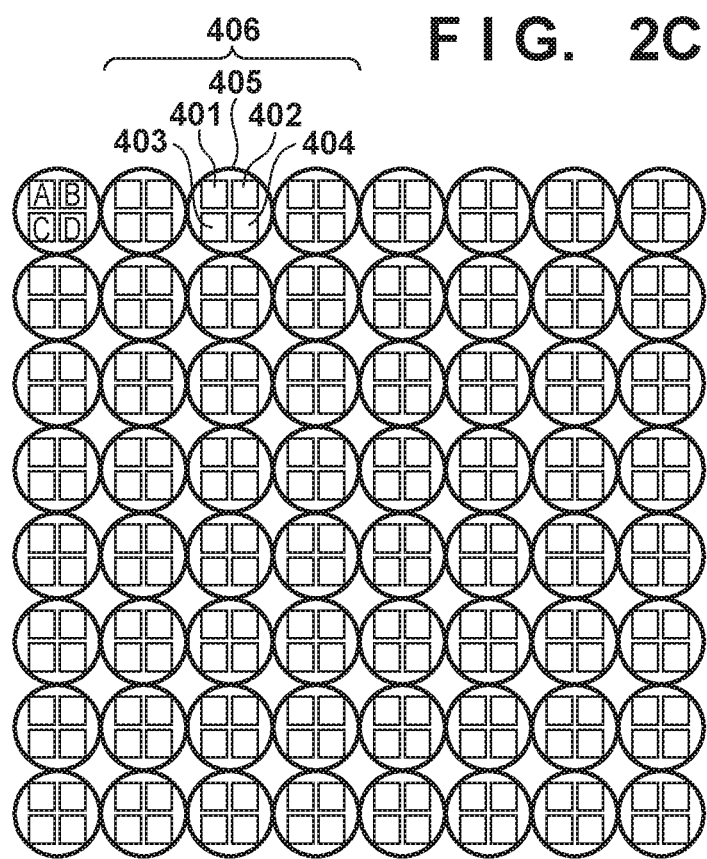

FIG. 2C is a schematic diagram illustrating an example of a pixel configuration and arrangement of the pixel unit 201. In the pixel unit 201, a plurality of pixels 406 are two-dimensionally arranged in the horizontal and vertical directions. Each of the pixels 406 includes one microlens 405 and four photoelectric conversion units 401, 402, 403, and 404. The four photoelectric conversion units 401 to 404, which share the one microlens 405, receive light beams that have passed through different partial pupil areas of the exit pupil of the optical system 104. Accordingly, four parallax images can be obtained as a result of performing exposure or capturing an image capturing once, by independently obtaining analog image signals from a photoelectric conversion unit 401 group, a photoelectric conversion unit 402 group, a photoelectric conversion unit 403 group, and a photoelectric conversion unit 404 group, in the plurality of pixels 406. The four parallax images, which are a plurality of images with different viewpoints, can also be called multi-viewpoint images.

In this embodiment, out of the parallax images that constitute multi-viewpoint images, an image obtained by the photoelectric conversion unit 401 group is called an image A. An image obtained by the photoelectric conversion unit 402 group is called an image B. An image obtained by the photoelectric conversion unit 403 group is called an image C. An image obtained by the photoelectric conversion unit 404 group is called an image D.

Figure 3:
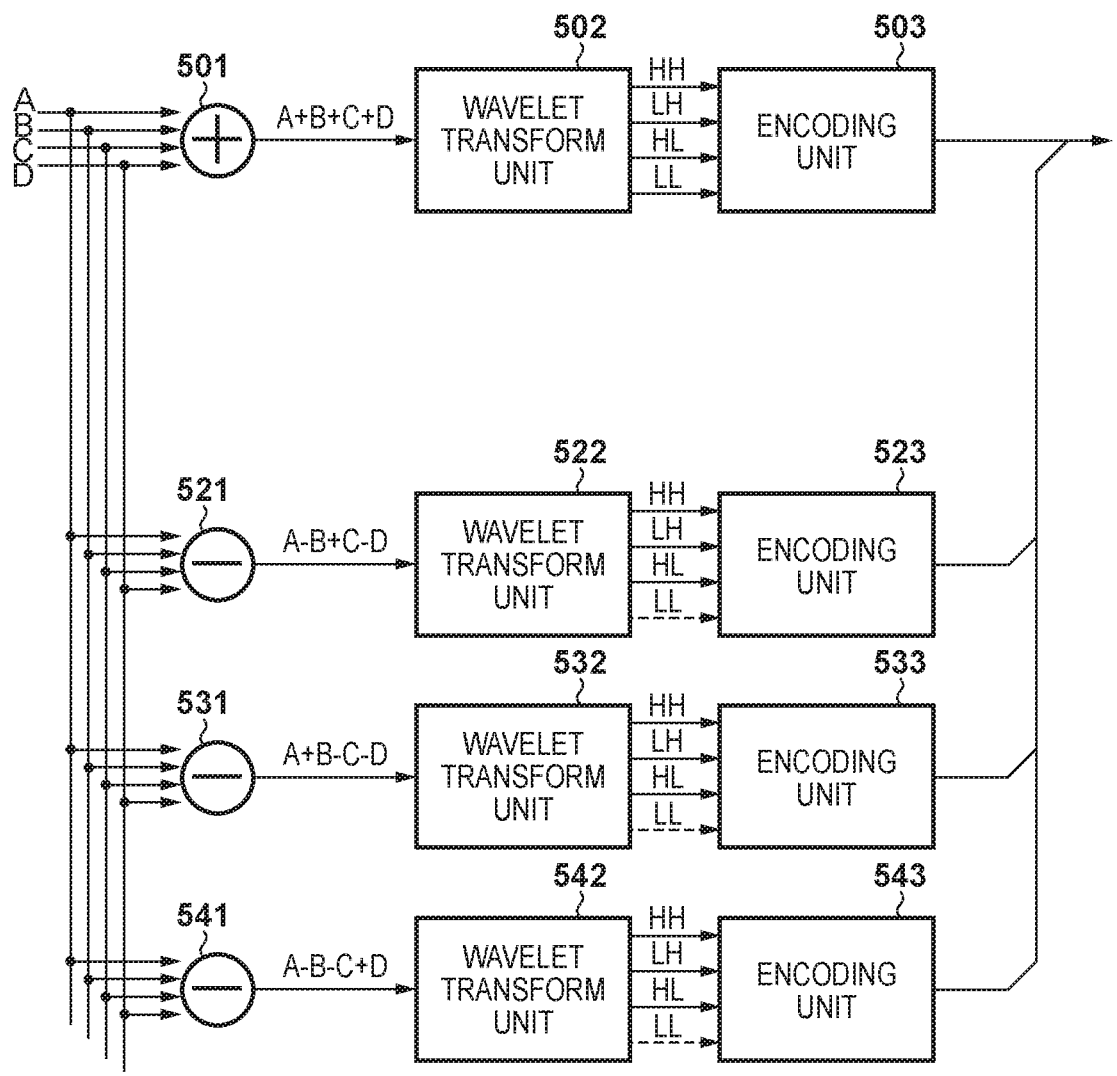
FIG. 3 relates to a functional configuration of an image compression unit in the image capture unit according to the embodiment.

FIG. 3 is a block diagram illustrating a functional configuration example of the image compression unit 203 in FIG. 2A. An adder unit 501 adds the images A to D with the shift amount being 0, and averages respective pixel values (i.e. divides respective pixel values by four), thereby generating a composite image (A+B+C+D). Although the composite image here is an average image of the multi-viewpoint images, the composite image may not be the average image. For example, a composite image may be generated by simply adding pixel values, and the generated composite image may be corrected so that the range of the pixel values of a plurality of parallax images that constitute the multi-viewpoint images matches the range of the pixel values of the composite image. In this specification, an image A+B refers to an image based on addition of the images A and B, or an image that is equal thereto. That is to say, the image A+B may be an image based on addition of a signal group obtained from the photoelectric conversion units 401 and a signal group obtained from the photoelectric conversion units 402, or may be a signal group obtained from photoelectric conversion units, each of which is equal to a combination of the photoelectric conversion unit 401 and the photoelectric conversion unit 402. The same applies to subtraction between images, that is, subtraction between images may be actually performed, or an image that corresponds to a subtraction result may be acquired.

Subtracter units 521, 531, and 541 calculate A−B+C−D, A+B−C−D, and A−B−C+D, respectively. The combinations of addition and subtraction between the images A to D performed by the subtracter units 521, 531, and 541 are determined so that the images A to D can be restored by performing computation also using the composite image, and so that a subtraction is included. Also, in this specification, images obtained by the subtracter units 521, 531, and 541 are called difference images, for convenience. Note that addition and subtraction between images can be realized by adding and subtracting values of pixels at the same position in the images. If an addition/subtraction result exceeds an upper limit value of the pixel values or falls below a lower limit thereof, the result may be clipped at the upper limit value/lower limit value.

Wavelet transform units 502, 522, 532, and 542 apply two-dimensional wavelet transform (hereinafter, simply "wavelet transform"), which serves an example of two-dimensional sub-band division, to the images output by the adder unit 501 and the subtracter units 521, 531, and 541. Note that, in this embodiment, the wavelet transform unit $5n2$ (n=0, 2 to 4) applies wavelet transform at a decomposition level of up to 1.

Figure 4:
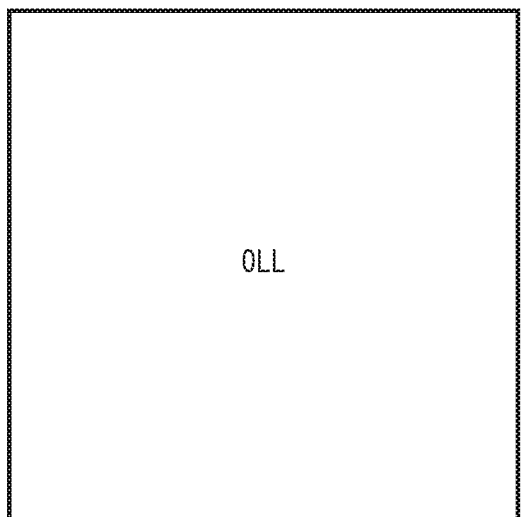
FIG. 4 relates to sub-band division to be performed by the image compression unit according to the embodiment.
Figure 4:
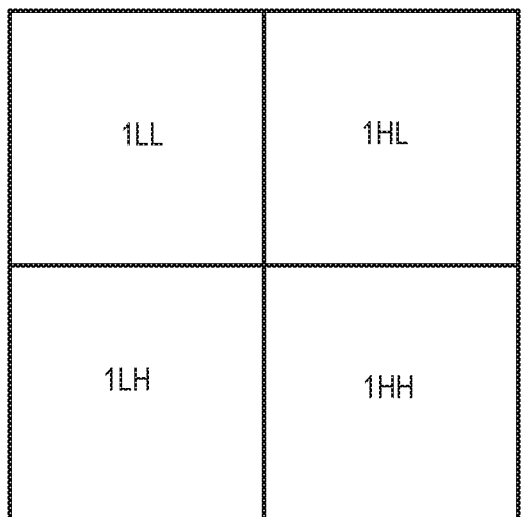
Figure 4:
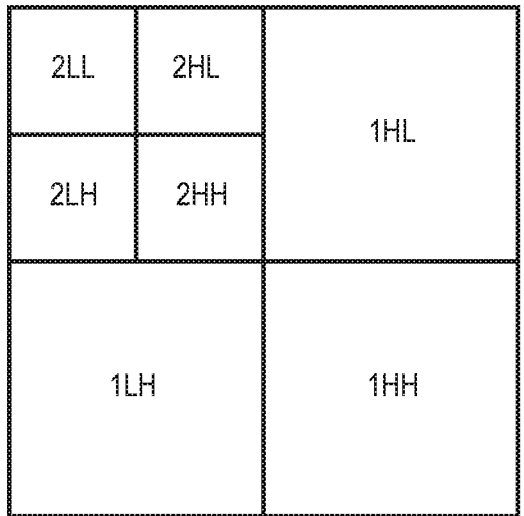
Figure 4:
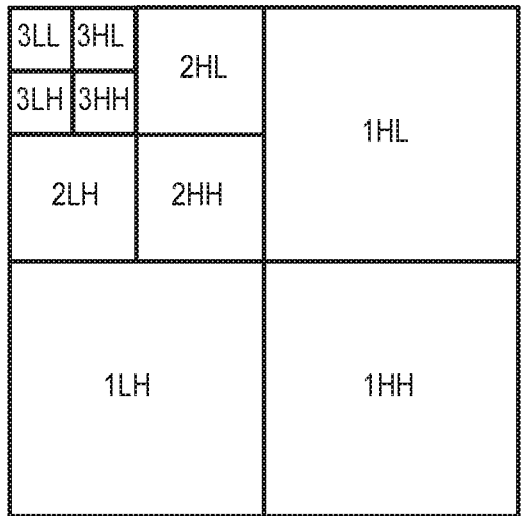

FIG. 4 schematically shows arrangements of a plurality of sub-band signals that are obtained through wavelet transform at decomposition levels 0 to 3. The decomposition level 0, which is denoted by 701, corresponds to an original image. 702 to 704 denote arrangements of sub-bands after wavelet transform at the decomposition levels 1 to 3, respectively. "n" in sub-bands nLL, nHL, nLH, and nHH indicates the decomposition level (1 to 3), and LL, HL, LH, and HH indicate types of band-pass filtering processing (high-pass filtering or low-pass filtering) that is applied in the horizontal and vertical directions. Of wavelet coefficients, the coefficient of the sub-band nLL that does not include high-frequency components is called a scaling coefficient, and the coefficients of remaining three sub-bands nHL, nLH, and nHH that include high-frequency components are called wavelet expansion coefficients.

Encoding units 503, 523, 533, and 543 apply encoding, such as quantization and arithmetic encoding, to coefficients (sub-band data) of the sub-bands that have been divided by wavelet transform. The encoding method performed by the encoding unit $5n3$ (n=0, 2 to 4) is not particularly limited, and may be lossless or lossy encoding.

Figure 5A:
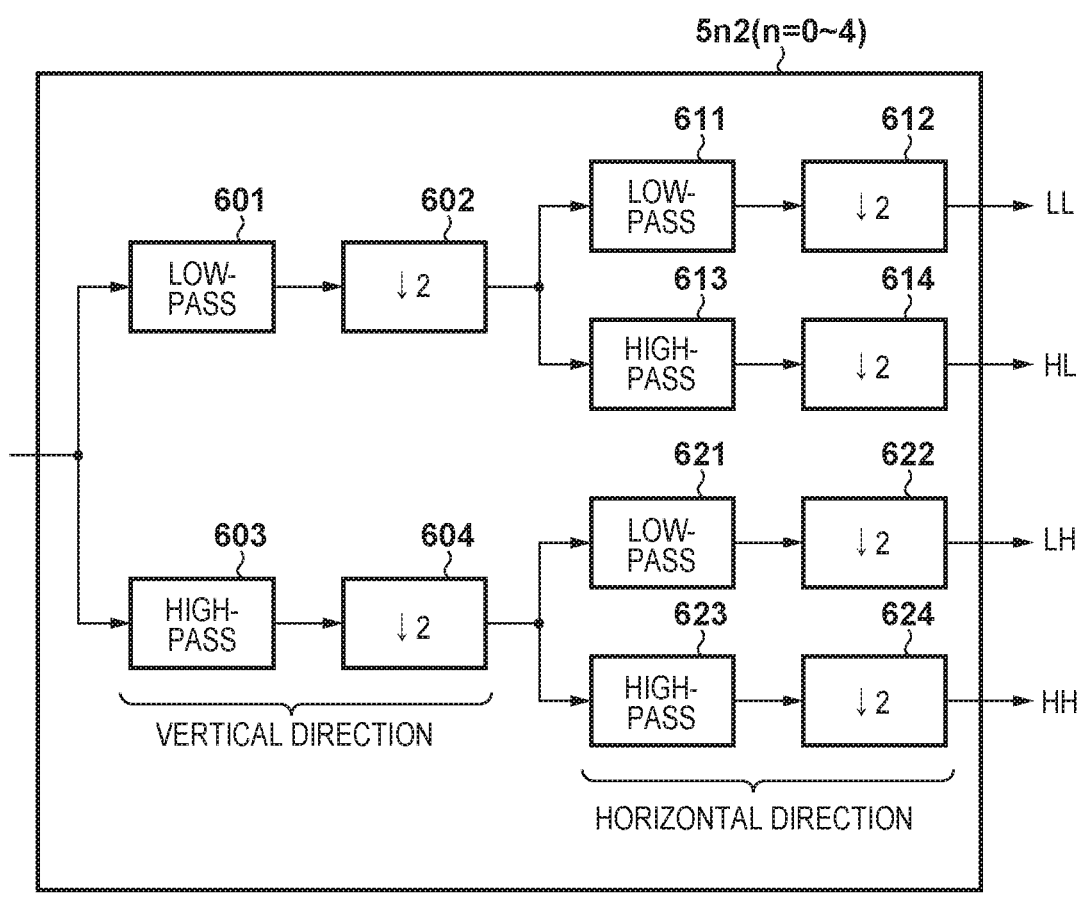
FIGS. 5A and 5B relate to a wavelet conversion unit included in the image compression unit according to the embodiment.

FIG. 5A is a block diagram illustrating a functional configuration example of the wavelet transform unit $5n2$ (n=0 to 4). In this embodiment, as an example, wavelet transform using orthonormal wavelets, which are expressed by Expressions 1 and 2 below, is performed.

$$H0(z)=b0+\Sigma bn \cdot (z^n+z^{-n}) \quad \text{(Expression 1)}$$

$$H1(z)=c0+\Sigma cn \cdot (z^n+z^{-n}) \quad \text{(Expression 2)}$$

Here, n is an integer that is any of 0 to 3, and the values of coefficients bn and cn are as follows.

b0=0.602949
b1=0.266864
b2=−0.078223
b3=−0.016864
b4=0.026748
c0=1.115087
c1=−0.591271
c2=−0.057543
c3=0.091271

Figure 5B:
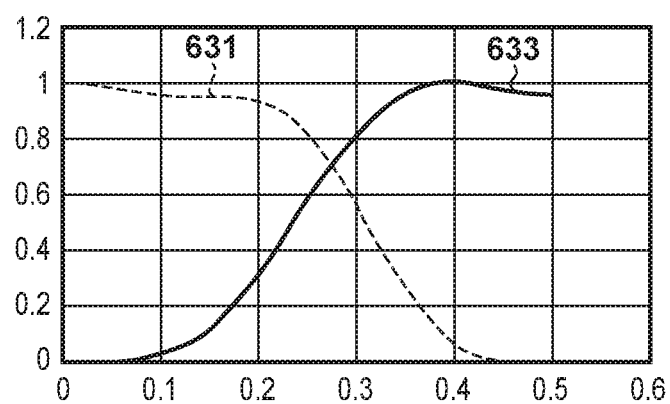

The coefficient bn is a sequence that expresses the scaling function of the wavelet, and the coefficient cn is a sequence that expresses the wavelet. FIG. 5B illustrates amplitude-frequency characteristics 631 of the transfer function $H0(z)$, and amplitude-frequency characteristics 633 of the transfer function $H1(z)$. The vertical axis and the horizontal axis of the amplitude-frequency characteristics indicate, respectively, the amplitude and the normalized frequency that is normalized by sampling frequency, and the Nyquist frequency corresponds to 0.5.

The low-pass filter unit 601 has the transfer function $H0(z)$, and generates a scaling coefficient in the vertical direction. A high-pass filter unit 603 has the transfer function $H1(z)$, and generates a wavelet expansion coefficient in the vertical direction. Downsampling units 602 and 604 halve the number of pixels through downsampling in the vertical direction.

Low-pass filter units 611 and 621 have the transfer function $H0(z)$, and generate scaling coefficients in the horizontal direction. High-pass filter units 613 and 623 have the transfer function $H1(z)$, and generate wavelet expansion coefficients in the horizontal direction. Downsampling units 612, 622, 614, and 624 halve the number of pixels through downsampling in the horizontal direction.

The encoding unit 503, which corresponds to the composite image, outputs encoded data of the scaling coefficient (1LL) and the wavelet expansion coefficients (1LH, 1HL, and 1HH). The encoding units 523, 533, and 543, which correspond to three difference images, only output encoded data of the wavelet expansion coefficients (1LH, 1HL, and 1HH). This can also be realized by outputting only coefficients that are to be encoded, from the wavelet transform units to the respective encoding units, or by ignoring coefficients other than those that are to be encoded by the encoding units.

Since all of the wavelet coefficients LL, HL, LH, and HH are downsampled to be halved in both the horizontal and vertical directions when generated, the number of coefficients after having been encoded is one-fourth of that before encoding. Accordingly, if the number of pixels of the original image is 1, the number of encoded data is 1+¾×3=(3+¼), and the amount of encoded data can be reduced compared with the case of encoding all sub-band data of the images A to D (1×4=4).

In the pixel unit with the configuration shown in FIG. 2C, if vignetting occurs on some of the light beams toward the pixels 406 due to the optical system 104, the amount of light incident on the photoelectric conversion units 401 to 404 becomes uneven. Consequently, the signal level decreases in at least one of the image signals output by the photoelectric conversion units 401 to 404. Since the signal level lowers in the same photoelectric conversion unit in all pixels, a luminance difference (hereinafter, "shading") occurs between parallax images.

Since vignetting pertains to the characteristics of the optical system 104, the photoelectric conversion unit in which the signal level will decrease and the degree of the decrease in the signal level are known, and accordingly the lowering in the signal level can be corrected (shading correction). However, the degree of shading depends on optical conditions (exit pupil distance, f-number etc.) of the optical system 104, and therefore, preset shading correction may be excessive or insufficient. Also, it is known that the shading component can be approximated by a low-degree polynomial, and most correction errors (overcorrection component, inverse correction component) are included in the scaling coefficient (LL) due to wavelet transform.

If an error has occurred in shading correction, a differential value between parallax images increases. For this reason, the efficiency of inter-frame differential encoding between parallax images deteriorates. However, in this embodiment, as for the difference image between parallax images, only the wavelet expansion coefficients that are hardly affected by correction errors are encoded. Accordingly, the encoding efficiency does not significantly deteriorate even if an error has occurred in shading correction.

Moreover, most of the wavelet expansion coefficients, which include high-frequency components of images, pertain to the subject component with small blur, and parallax between four parallax images is also small. For this reason, a differential value between parallax images is small, and a high encoding efficiency can also be realized in this regard.

Since the amount of encoded data output from the image capture unit 105 is reduced, it is possible to suppress a decrease in the frame rate for moving images and the number of still images that can be continuously captured, even in the case of handling multi-viewpoint images. Also, the number of still images that can be continuously captured can be increased without changing the buffer capacity to be secured in the RAM 103.

The control unit 101 records the encoded data of the composite image and the three difference images that are output by the image capture unit 105, to the recording medium 108. Note that, when recording the encoded data into the recording medium 108, the control unit 101 includes, in a header or the like of a data file, information regarding the decomposition level of wavelet transform and sub-bands recorded for the composite image and the parallax images. The encoded data that is read out from the recording medium 108 can be loaded to the RAM 103, and can be decoded and subjected to refocusing by the image processing unit 107.

Figure 6A:
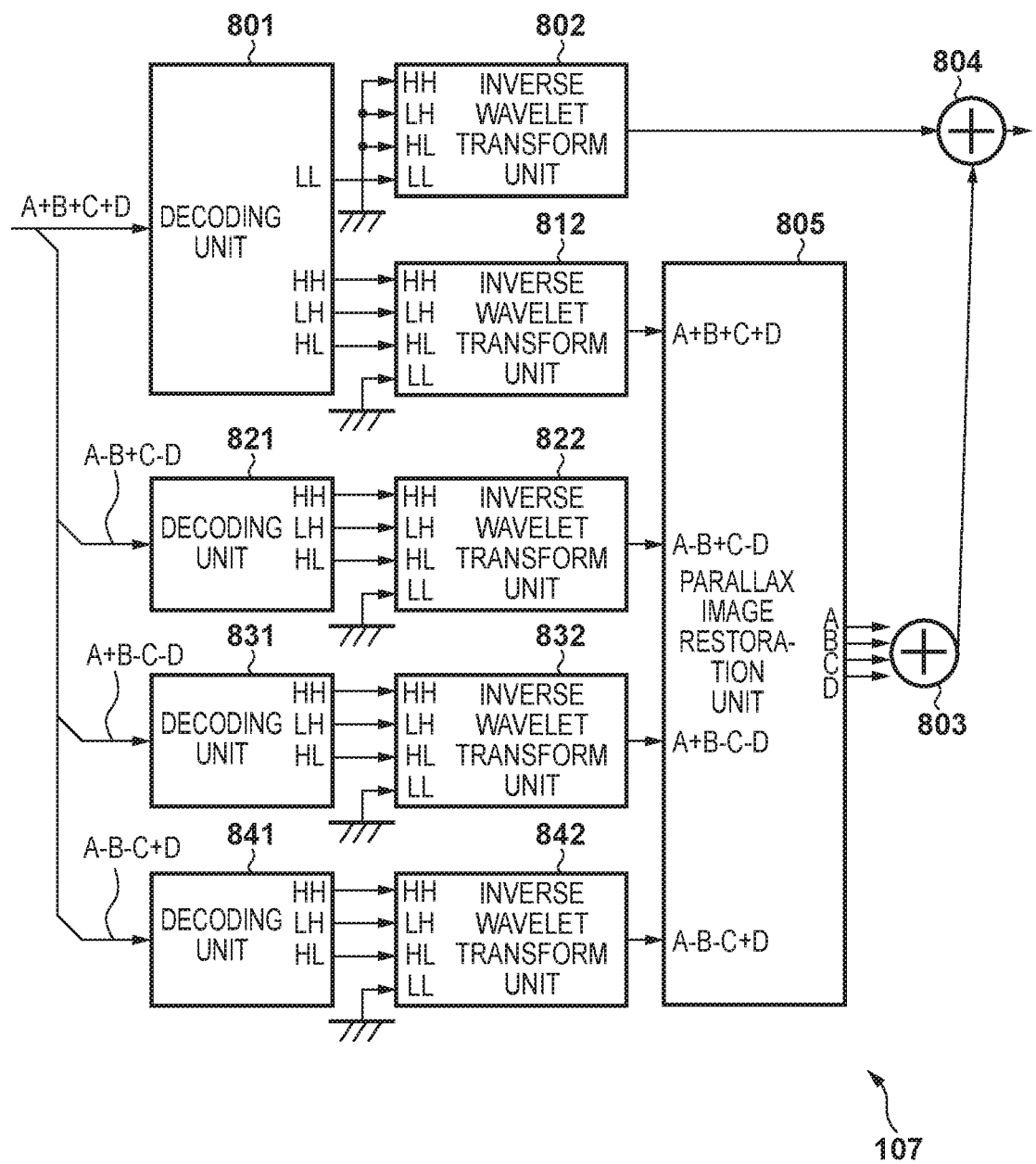
FIGS. 6A and 6B relate to a functional configuration of an image processing unit according to the embodiment.

FIG. 6A illustrates, using functional blocks, operations of the image processing unit 107 when decoding the encoded data. The decoding and refocusing described here are merely some of various kinds of image processing that the image processing unit 107 can perform. Processing to extract encoded data from a data file and distribute the encoded data to decoding units is also performed within the image processing unit 107. A decoding unit 801 decodes the encoded data (scaling coefficient (1LL) and wavelet expansion coefficients (1LH, 1HL, and 1HH) at decomposition level 1) of the composite image. Decoding units 821, 831, and 841 decode the encoded data (wavelet expansion coefficients (1LH, 1HL, and 1HH at decomposition level 1) of the difference images. The decoding unit $8n4$ (n=0, 2 to 4) performs decoding corresponding to the encoding method.

Inverse wavelet transform units 802, 812, 822, 832, and 842 restore the images that have been divided into sub-bands, by performing two-dimensional inverse wavelet transform on the respective decoded sub-band data (sub-band restoration). The decoding unit 801, which decodes the encoded data of the composite image, only supplies the scaling coefficient (1LL) to the inverse wavelet transform unit 802. For this reason, the inverse wavelet transform unit 802 performs inverse wavelet transform with the wavelet expansion coefficients (1LH, 1HL, and 1HH) being 0.

The decoding unit 801 supplies the decoded wavelet expansion coefficients (1LH, 1HL, and 1HH) of the composite image to the inverse wavelet transform unit 812.

Decoding units 821, 831, and 841 supply the decoded wavelet expansion coefficients (1LH, 1HL, and 1HH) of the difference images to inverse wavelet transform units 822, 832, and 842. The inverse wavelet transform units 812, 822, 832, and 842 perform inverse wavelet transform with the scaling coefficient (1LL) being 0.

A parallax image restoration unit 805 calculates Expressions 3 to 6 below for the composite image and the difference images that have been restored by the inverse wavelet transform unit $8n2$ (n=1 to 4), and restores the four parallax image (images A to D).

$$A=(W+X+Y+Z)/4 \quad \text{(Expression 3)}$$

$$B=(W-X+Y-Z)/4 \quad \text{(Expression 4)}$$

$$C=(W+X-Y-Z)/4 \quad \text{(Expression 5)}$$

$$D=(W-X-Y+Z)/4 \quad \text{(Expression 6)}$$

Here, W, X, Y, and Z are as follows.

$W=A+B+C+D$(composite image output by the inverse wavelet transform unit 812)

$X=A-B+C-D$(difference image output by the inverse wavelet transform unit 822)

$Y=A+B-C-D$(difference image output by the inverse wavelet transform unit 832)

$Z=A-B-C+D$(difference image output by the inverse wavelet transform unit 842)

The parallax image restoration unit 805 supplies the restored images A to D to a shift-and-add operation unit 803.

The shift-and-add operation unit 803 performs a shift-and-add operation for refocusing, on the restored images A to D. Refocusing by means of a shift-and-add operation is known, as described in Japanese Patent Laid-Open No. 2015-171097, for example. The control unit 101 displays, for example, the composite image on the display unit 110, and makes the user select the position to be brought into focus. For example, the control unit 101 determines the amount and direction of the shift-and-add operation so that the position in the image that has been designated through the operation unit 109 comes into focus, and notifies the shift-and-add operation unit 803 of the determined amount and direction. The shift-and-add operation unit 803 performs the shift-and-add operation on the images A to D in accordance with the shift direction and amount of which it has been notified, thereby generating a refocused image. The shift-and-add operation unit 803 outputs the image that has been subjected to refocusing, to an adder unit 804. The adder unit 804 adds the composite image that has been restored with the wavelet expansion coefficients (1LH, 1HL, and 1HH) being 0, and the image obtained by performing the shift-and-add operation on the parallax images that have been restored with the scaling coefficient (1LL) being 0. An ultimate refocused image is obtained by the adder unit 804.

Figure 6B:
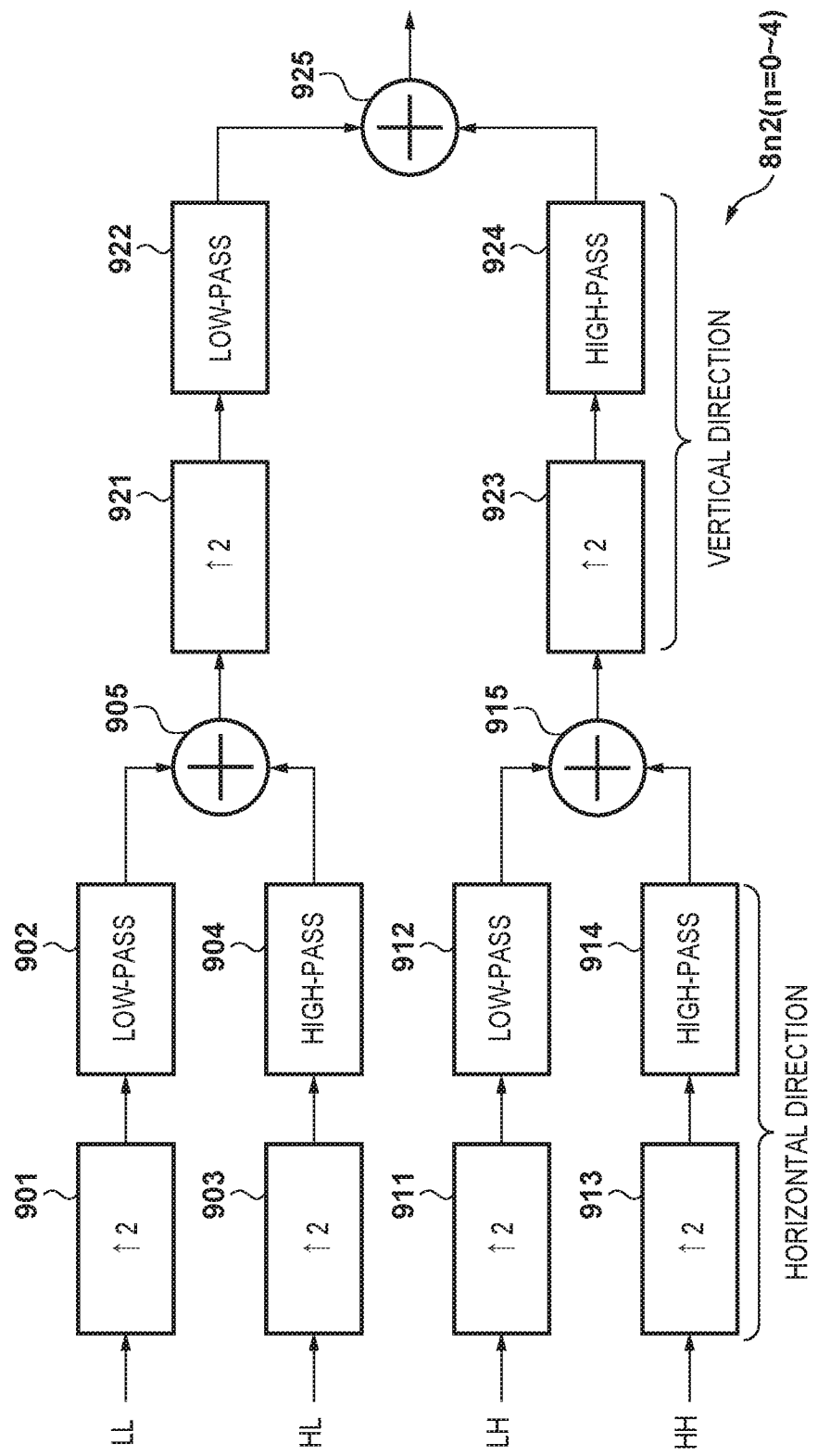

FIG. 6B is a block diagram illustrating a functional configuration example of the inverse wavelet transform unit $8n2$ (n=0 to 4) in FIG. 6A.

Upsampling units 901, 903, 911, and 913 double the number of pixels through upsampling in the horizontal direction. Low-pass filter units 902 and 912 apply low-pass filtering in the horizontal direction. High-pass filter units 904 and 914 apply high-pass filtering in the horizontal direction. Upsampling units 921 and 923 double the number of pixels through upsampling in the vertical direction. A low-pass filter unit 922 applies low-pass filtering in the vertical direction. A high-pass filter unit 924 applies high-pass filtering in the vertical direction. Adder units 905, 915, and 925 add intermediate images in the process of inverse wavelet transform.

The inverse wavelet transform units also perform inverse wavelet transform using orthonormal wavelets, which are expressed by Expressions 7 and 8 below.

$$G0(z)=d0+\Sigma dn\cdot(z^n+z^{-n})$$ (Expression 7)

$$G1(z)=e0+\Sigma en\cdot(z^n+z^{-n})$$ (Expression 8)

The values of the coefficients are as follows.

Here, n is an integer that is any of 0 to 3, and the values of coefficients bn and en are as follows.
d0=1.115087
d1=0.591271
d2=−0.057543
d3=−0.091271
e0=0.602949
e1=−0.266864
e2=−0.078223
e3=0.016864
e4=0.026748

The transfer function of the low-pass filter units is $G0(z)$, and the transfer function of the high-pass filter units is $G1(z)$.

In this embodiment, a refocused image is generated without performing a shift-and-add operation on low-frequency components (scaling coefficient (1LL)) of the images. However, in the case of refocusing with the shift amount being about 1 or 2 pixels, focus in low-frequency components hardly changes. For this reason, it is possible to achieve a focus adjustment effect that is equal to that of a conventional technique in which a shift-and-add operation is performed on all sub-band components.

Figure 7:
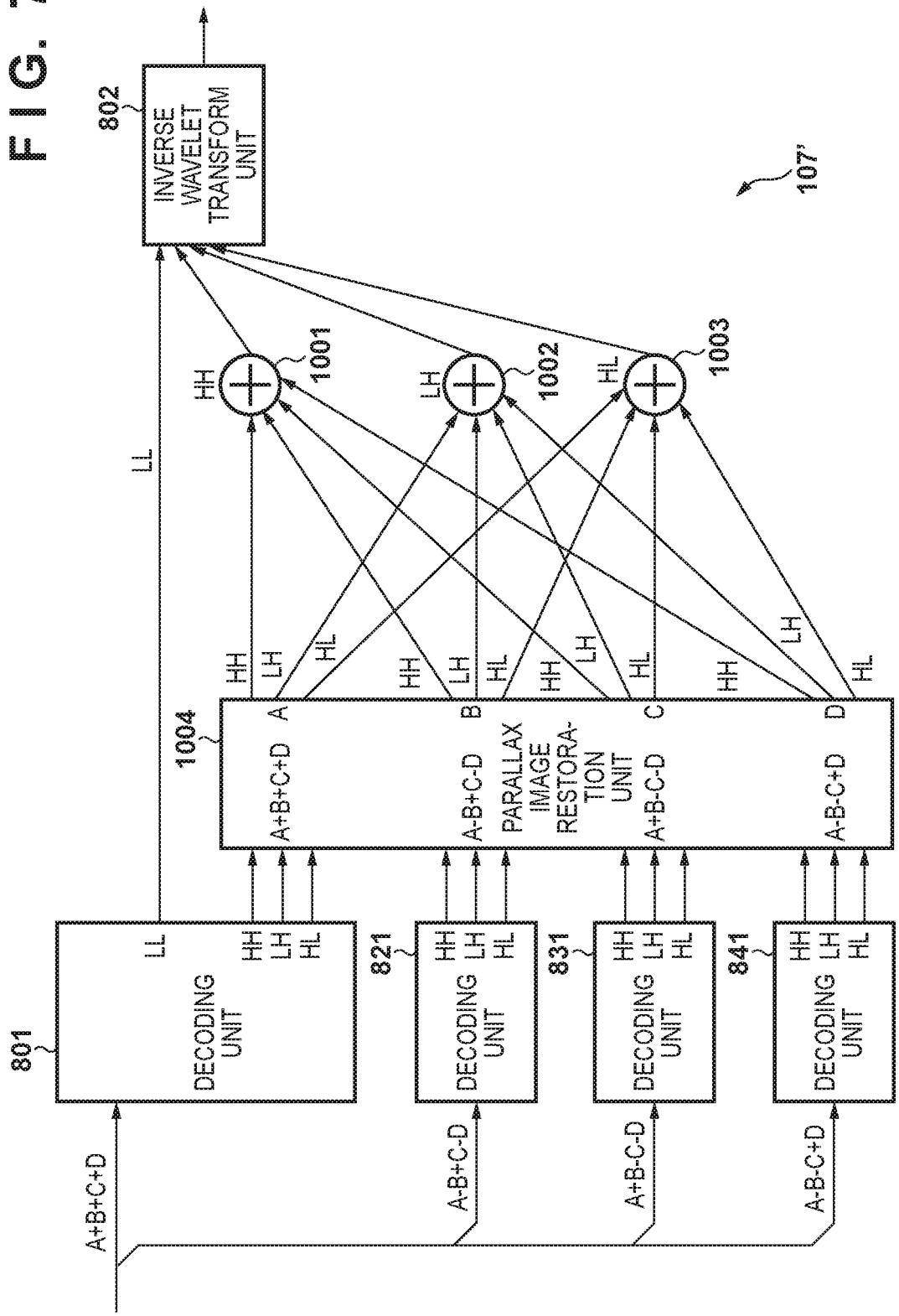
FIG. 7 relates to another functional configuration of the image processing unit according to the embodiment.

This embodiment has described a configuration in which a shift-and-add operation is performed on the images that have been subjected to inverse wavelet transform. However, a configuration may also be employed in which inverse wavelet transform is performed after performing a shift-and-add operation on each of the sub-band components. FIG. 7 illustrates a functional configuration example of an image processing unit 107' in this case. The same constituent elements as those in FIG. 6A are assigned the same reference numerals.

A parallax image restoration unit 1004 receives a supply of the decoded wavelet expansion coefficients (LH, HL, and HH) from the decoding units 801, 821, 831, and 841. The parallax image restoration unit 1004 calculates Expressions 3 to 6 for each sub-band to restore the wavelet expansion coefficients (LH, HL, and HH) of the four parallax images (images A to D). The parallax image restoration unit 1004 then supplies the restored wavelet expansion coefficients to shift-and-add operation units 1001, 1002, and 1003 corresponding to the respective sub-bands.

Shift-and-add operation units 1001, 1002, and 1003 perform a shift-and-add operation on HH, LH, and HL sub-band components, respectively, of the images A to D. Since the shift-and-add operation is performed on the sub-band components at decomposition level 1 whose number of pixels has been halved in the horizontal and vertical directions through downsampling, the shift amount is limited to units of 2n pixels. However, the number of times of inverse wavelet transform computation can be reduced, and accordingly, the computational costs can be reduced. The shift-and-add operation units 1001, 1002, and 1003 supply the wavelet expansion coefficients after having been subjected to the shift-and-add operation to the inverse wavelet transform unit 802. The inverse wavelet transform unit 802 performs inverse wavelet transform on the scaling coefficient (1LL) from the decoding unit 801 and the wavelet expansion coefficients (LH, HL, and HH) from the shift-and-add operation units 1001, 1002, and 1003, and generates an ultimate refocused image.

This embodiment has described a configuration in which the decomposition level of wavelet transform is 1. However, this embodiment is also applicable to the case of performing wavelet transform at decomposition levels 2 and 3, which are denoted by 703 and 704 in FIG. 4.

Figure 8:
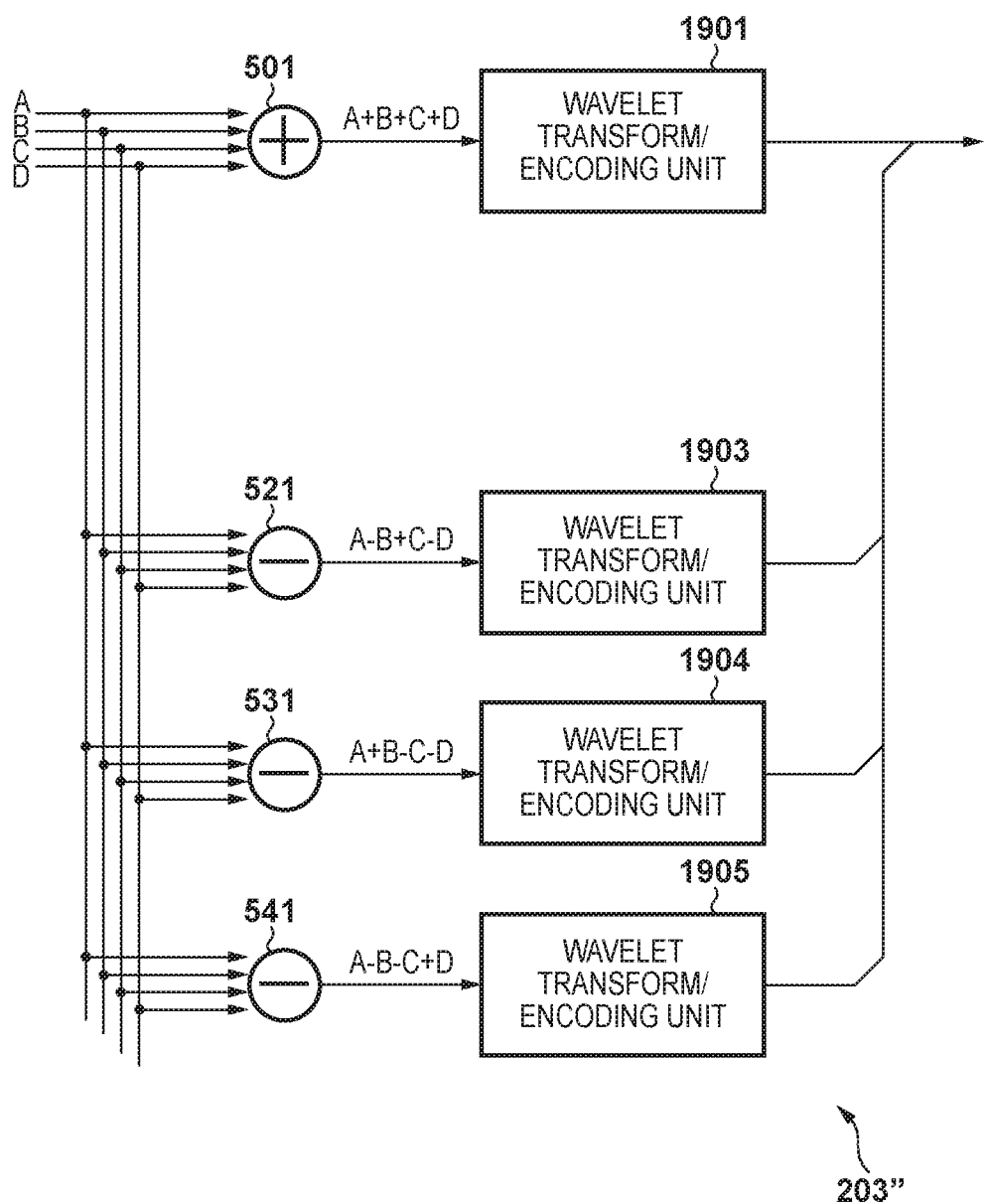
FIG. 8 relates to another functional configuration of the image compression unit according to the embodiment.

FIG. 8 is a block diagram illustrating a functional configuration example of an image compression unit 203" in the case of performing wavelet transform at up to decomposition level 3. The adder unit 501 generates a composite image (A+B+C+D) of the images A to D, and supplies the generated composite image to an wavelet transform/encoding unit 1901. Wavelet transform/encoding units 1903 to 1905 receive a supply of the aforementioned difference images from the subtracter units 521, 531, and 541, respectively.

Figure 9A:
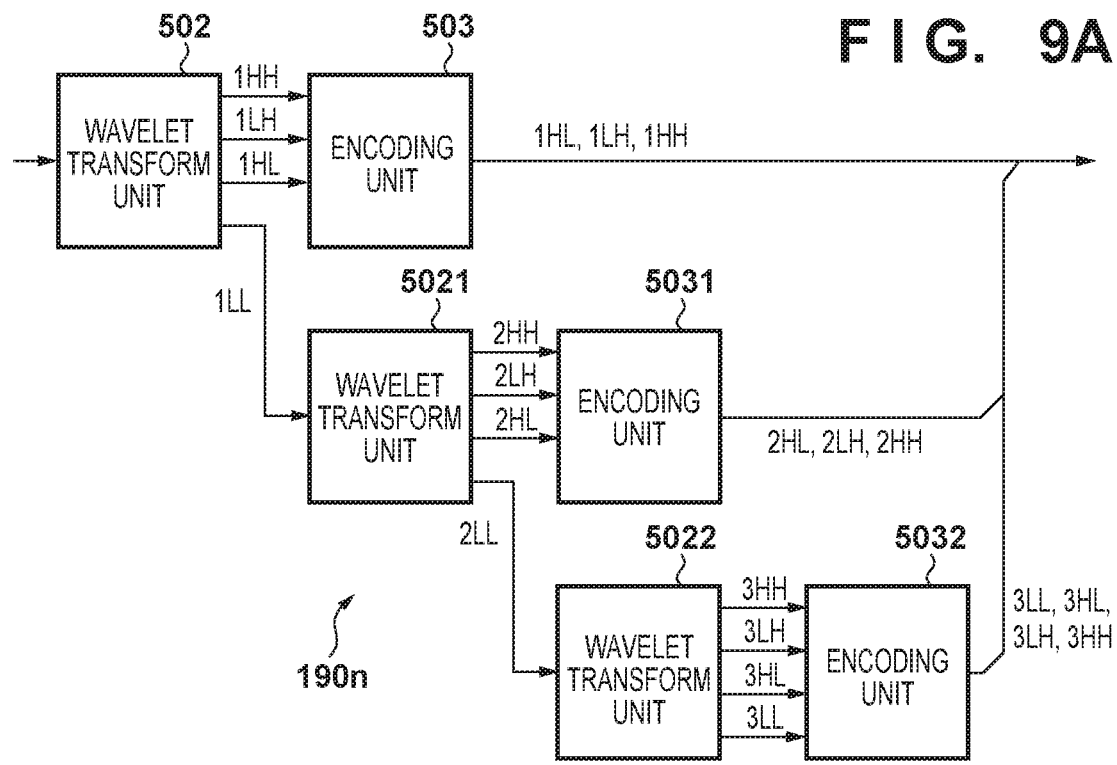
FIGS. 9A to 9C relate to the details of FIG. 8.

FIG. 9A is a block diagram illustrating a functional configuration example of the wavelet transform/encoding unit 190n (n=1, 3 to 5). Each of the wavelet transform/encoding units 190n includes wavelet transform units 5021 and 5022 and encoding units 5031 and 5032, which have the same configuration as that of the wavelet transform unit 502 and the encoding unit 503, respectively. The wavelet transform/encoding unit 190n handles wavelet transform and encoding at decomposition levels 1 to 3.

FIG. 9A illustrates a flow of signals in the case of performing wavelet transform at decomposition level 3. In this case, the wavelet transform units 502 and 5021, which perform wavelet transform at decomposition levels 1 and 2, respectively, output the scaling coefficient to the subsequent wavelet transform units 5021 and 5022, and output the wavelet expansion coefficients to the downstream encoding units 503 and 5031. The wavelet transform unit 5022, which performs wavelet transform at decomposition level 3, outputs the scaling coefficient and the wavelet expansion coefficients to the downstream encoding unit 5032. The encoding units 503, 5031, and 5032 output encoded data of coefficients that correspond to decomposition levels 1, 2, and 3, respectively. Note that the wavelet transform unit 5022 of the wavelet transform/encoding unit 190n (n=3 to 5) does not supply the scaling coefficient (3LL) to the encoding unit 5032. The encoding units 503, 5031, and 5032 of the wavelet transform/encoding unit 190n (n=3 to 5) encode only the wavelet expansion coefficients.

Figure 9B:
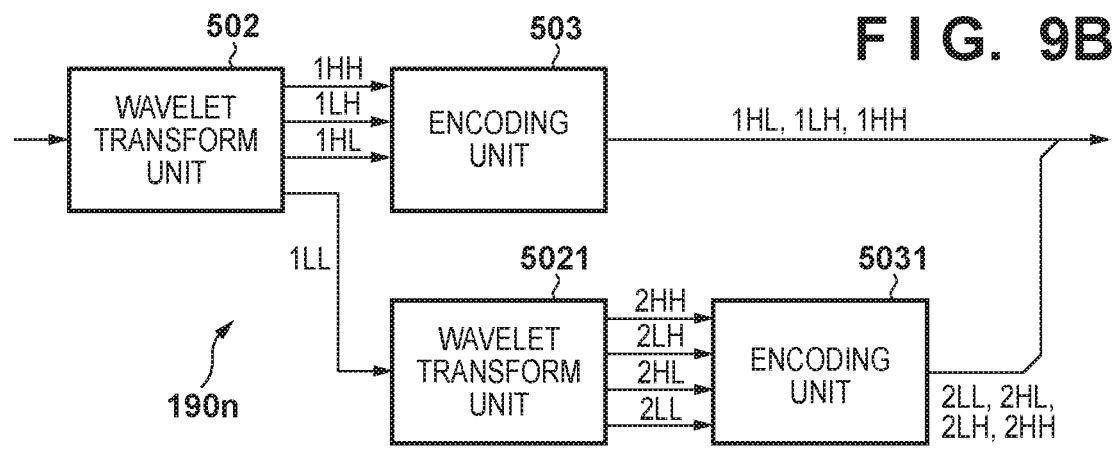

FIG. 9B illustrates a flow of signals in the case of performing wavelet transform at decomposition level 2. In this case, the wavelet transform unit 502, which performs wavelet transform at decomposition level 1, outputs the scaling coefficient to the subsequent wavelet transform unit 5021, and outputs the wavelet expansion coefficients to the downstream encoding unit 503. The wavelet transform unit 5021, which performs wavelet transform at decomposition level 2, outputs the scaling coefficient and the wavelet expansion coefficients to the downstream encoding unit 5031. The encoding units 503 and 5031 output encoded data of the coefficients that correspond to decomposition levels 1 and 2, respectively. Note that the wavelet transform unit 5021 of the wavelet transform/encoding unit 190n (n=3 to 5) does not supply the scaling coefficient (2LL) to the encoding unit 5031. The encoding units 503 and 5031 of the wavelet transform/encoding unit 190n (n=3 to 5) only encode the wavelet expansion coefficients.

Figure 9C:
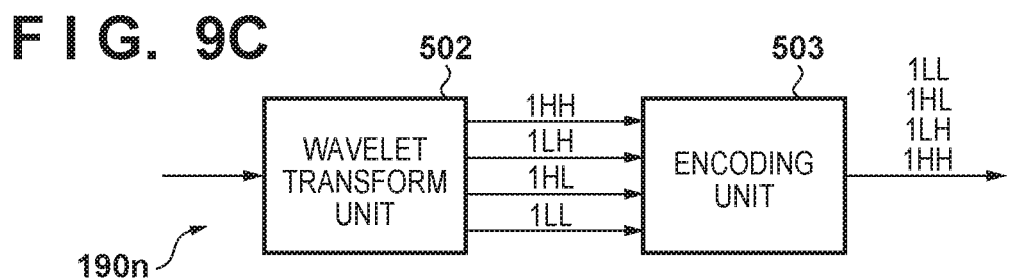

FIG. 9C illustrates a flow of signals in the case of performing wavelet transform at decomposition level 1. In this case, the wavelet transform unit 502 of the wavelet transform/encoding unit 1901 only outputs the scaling coefficient to the encoding unit 503. The wavelet transform units 502 of the wavelet transform/encoding units 1903 to 1905 only output the wavelet expansion coefficients to the encoding unit 503.

Figure 10:
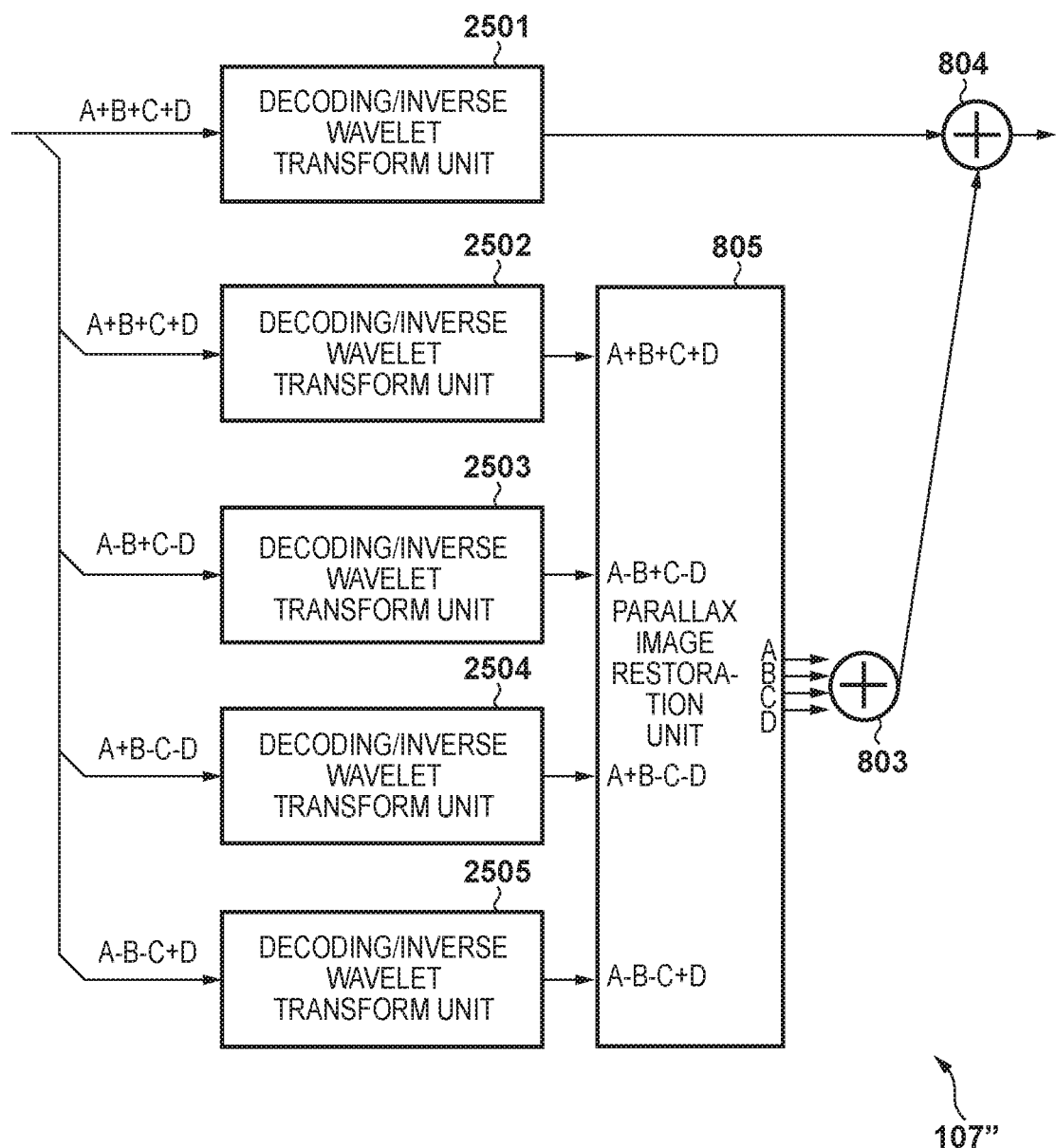
FIG. 10 relates to another functional configuration of the image processing unit according to the embodiment.

FIG. 10 is a block diagram illustrating a functional configuration example of an image processing unit 107" in the case of performing wavelet transform at up to decomposition level 3. The same functional blocks as those in FIG. 6A are assigned the same reference numerals. The image processing unit 107" includes decoding/inverse wavelet transform units 2501 to 2505, the parallax image restoration unit 805, the shift-and-add operation unit 803, and the adder unit 804.

Figure 11A:
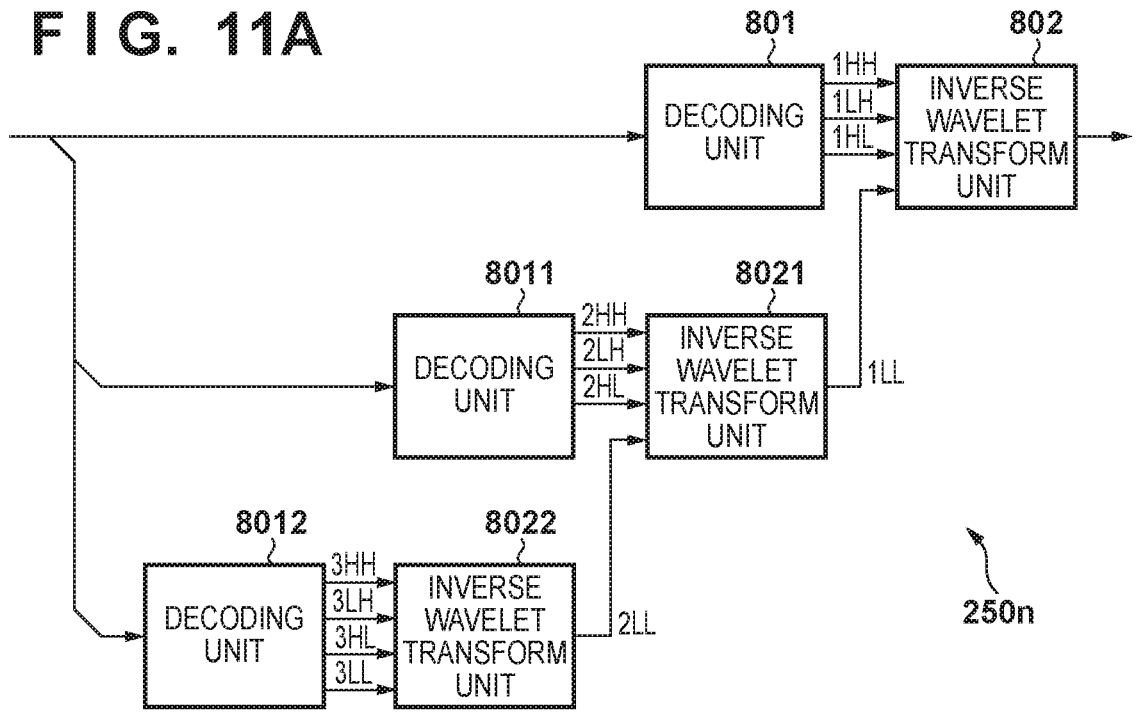
FIGS. 11A to 11C relate to the details of FIG. 10.

FIG. 11A is a block diagram illustrating a functional configuration example of the decoding/inverse wavelet transform unit 250n (n=1 to 5). The decoding/inverse wavelet transform unit 250n includes decoding units 8011 and 8012 and inverse wavelet transform units 8021 and 8022, which have the same configurations as those of the decoding unit 801 and the inverse wavelet transform unit 802, respectively. The wavelet transform/encoding unit 250n handles the decoding of the wavelet coefficients at decomposition levels 1 to 3, and inverse wavelet transform.

FIG. 11A illustrates a flow of signals in the case of performing inverse wavelet transform at decomposition level 3. In this case, the decoding units 801, 8011, and 8012 decode encoded data at decomposition levels 1 to 3, respectively, and supply the decoded data to the downstream inverse wavelet transform units 802, 8021, and 8022. Here, the scaling coefficient (LL) only exists in encoded data at the highest decomposition level. Accordingly, only the decoding unit 8012 supplies encoded data of all sub-bands to the inverse wavelet transform unit 8022. The other decoding units 801 and 8011 supply only the wavelet expansion coefficients to the inverse wavelet transform units 802 and 8021, respectively. The inverse wavelet transform unit 8022 performs inverse wavelet transform on the wavelet coefficients (including LL) at decomposition level 3 that are supplied from the decoding unit 8012, and restores the scaling coefficient (2LL) at decomposition level 2. The inverse wavelet transform unit 8022 supplies the restored scaling coefficient (2LL) at decomposition level 2 to the inverse wavelet transform unit 8021.

The inverse wavelet transform unit 8021 performs inverse wavelet transform on the wavelet expansion coefficients from the decoding unit 8011 and the scaling coefficient from the inverse wavelet transform unit 8022, and restore the scaling coefficient (1LL) at decomposition level 1. The inverse wavelet transform unit 8021 supplies the restored scaling coefficient (1LL) at decomposition level 1 to the inverse wavelet transform unit 802. The inverse wavelet transform unit 802 performs inverse wavelet transform on the wavelet expansion coefficients from the decoding unit 801 and the scaling coefficient from the inverse wavelet transform unit 8021, and restores the composite image or the difference images.

Note that the decoding/inverse wavelet transform units 2502 to 2505, which process the difference images, cannot obtain the scaling coefficient at the decoding units, and accordingly, the inverse wavelet transform unit 8022 performs inverse wavelet transform with the scaling coefficient (3LL) being 0.

The difference images (which correspond to the aforementioned W, X, Y, and Z) that have been restored by the decoding/inverse wavelet transform units 2502 to 2505 are supplied to the parallax image restoration unit 805. The parallax image restoration unit 805 calculates Expressions 3 to 6 for the difference images, and restores the difference images (images A to D). The subsequent processing is as described in relation to FIGS. 6A and 6B.

Figure 11B:
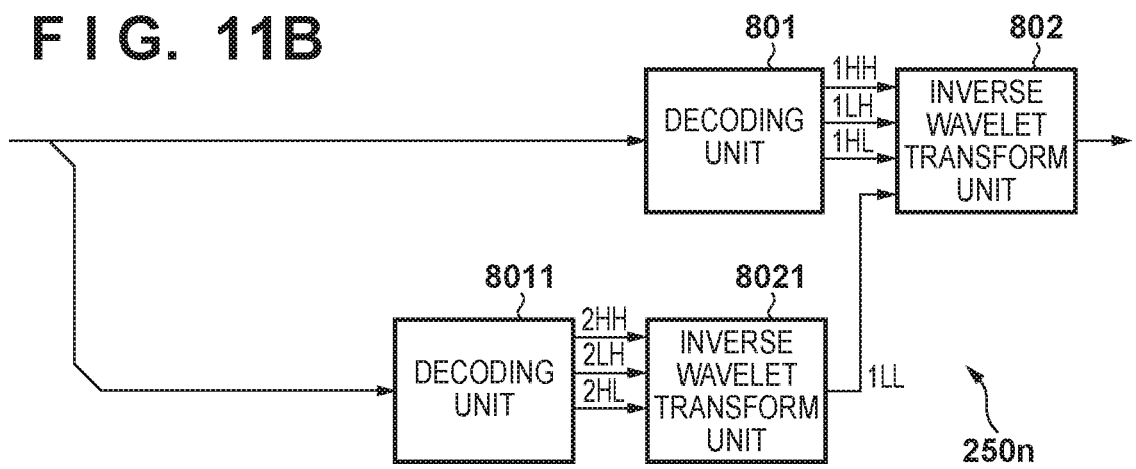

FIG. 11B illustrates a flow of signals in the case of performing inverse wavelet transform at decomposition level 2. In this case, the decoding unit 8012 and the inverse wavelet transform unit 8022 are not used. The decoding unit 8011 decodes all of the coefficients at decomposition level 2 including the scaling coefficient (2LL), and supplies the decoded coefficients to the inverse wavelet transform unit 8021. The remaining operation is as described in relation to FIG. 11A.

Figure 11C:
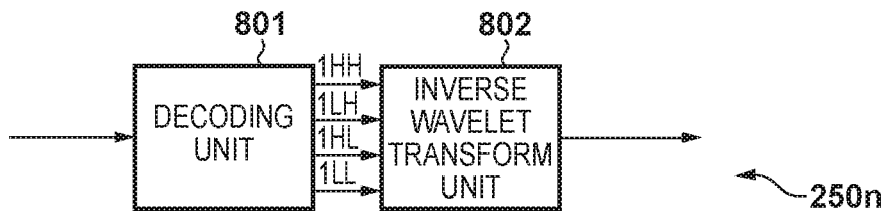

FIG. 11C illustrates a flow of signals in the case of performing inverse wavelet transform at decomposition level 1. In this case, only the decoding unit 801 and the inverse wavelet transform unit 802 are used. Also, the decoding unit 801 decodes all of the coefficients at decomposition level 1 including the scaling coefficient (1LL), and supplies the decoded coefficients to the inverse wavelet transform unit 802. The remaining operation is as described in relation to FIG. 11A.

If the decomposition level of wavelet transform is raised, the amount of computation increases, but the spatial frequency band that the parallax image data covers expands in the low-frequency direction, and thus the shift amount in the shift-and-add operation unit 803 can be increased. That is to say, the refocusable area can be expanded.

Also, this embodiment has a configuration in which the composite image and the difference images are compressed without adjusting the gain. However, the gain for parallax restoration may be adjusted before performing compression. In this case, Expressions 3 to 6 can be replaced with the following expressions.

$$A = W + X + Y + Z \qquad \text{(Expression 9)}$$

$$B = W - X + Y - Z \qquad \text{(Expression 10)}$$

$$C = W + X - Y - Z \qquad \text{(Expression 11)}$$

$$D = W - X - Y + Z \qquad \text{(Expression 12)}$$

Here, W, X, Y, and Z are as follows.

$$W = (A + B + C + D)/4$$

$$X = (A - B + C - D)/4$$

$$Y = (A + B - C - D)/4$$

$$Z = (A - B - C + D)/4$$

For example, if the output of the adder unit 501 and the subtracter units 521, 531, and 541 in FIG. 3 is 8-bit data, this data is shifted rightward by two bits, and the low-order six bits are output, thereby realizing division (¼) needed to calculate W, X, Y, and Z. Thus, with the configuration in which the gain of the composite image and the parallax images is reduced, the amount of encoded data can be further reduced.

Expressions 3 to 6 may also be replaced with the following expressions.

$$A = (W/4) + X + Y + Z \qquad \text{(Expression 13)}$$

$$B = (W/4) - X + Y - Z \qquad \text{(Expression 14)}$$

$$C=(W/4)+X-Y-Z \quad \text{(Expression 15)}$$

$$D=(W/4)-X-Y+Z \quad \text{(Expression 16)}$$

Here, W, X, Y, and Z are as follows.

$$W=A+B+C+D$$

$$X=(A-B+C-D)/4$$

$$Y=(A+B-C-D)/4$$

$$Z=(A-B-C+D)/4$$

With this configuration, only W (composite image) can be transmitted as-is in the form of 8-bit data, and accordingly, tone continuity of extracted images can be maintained in the case where fine focus adjustment using W only is not needed.

The first embodiment has been described thus far, including various modifications. In this embodiment, the composite image obtained by combining a plurality of parallax images and a plurality of difference images obtained by performing addition and subtraction between the plurality of parallax images are respectively subjected to two-dimensional sub-band division. As for the composite image, data of the respective sub-bands is encoded, and as for the difference images, data of the sub-bands including high-frequency components is encoded. This configuration can reduce the amount of encoded data compared with the case of encoding a plurality of parallax images, without restricting the use of the parallax images.

For this reason, if, for example, a plurality of parallax images are used to generate a refocused image, any area in the images can be subjected to refocusing. It is also possible to increase the frame rate during image capture and the number of images that can be continuously captured, without changing the configuration of the image capture apparatus. Note that the usage of parallax images to which the present invention is applied is not limited to generation of a refocused image. For example, the present invention is also applicable to parallax images to be used in automatic focus detection. In this case, an increase in the frame rate when capturing parallax images as a result of applying the present invention will shorten the time required for automatic focus detection.

Second Embodiment

Next, the second embodiment of the present invention will be described. Note that this embodiment can be carried out by the same functional configuration as that of the digital camera 100 described in the first embodiment. Thus, the second embodiment will be described using the same reference numerals as those in the first embodiment.

Figure 12A:
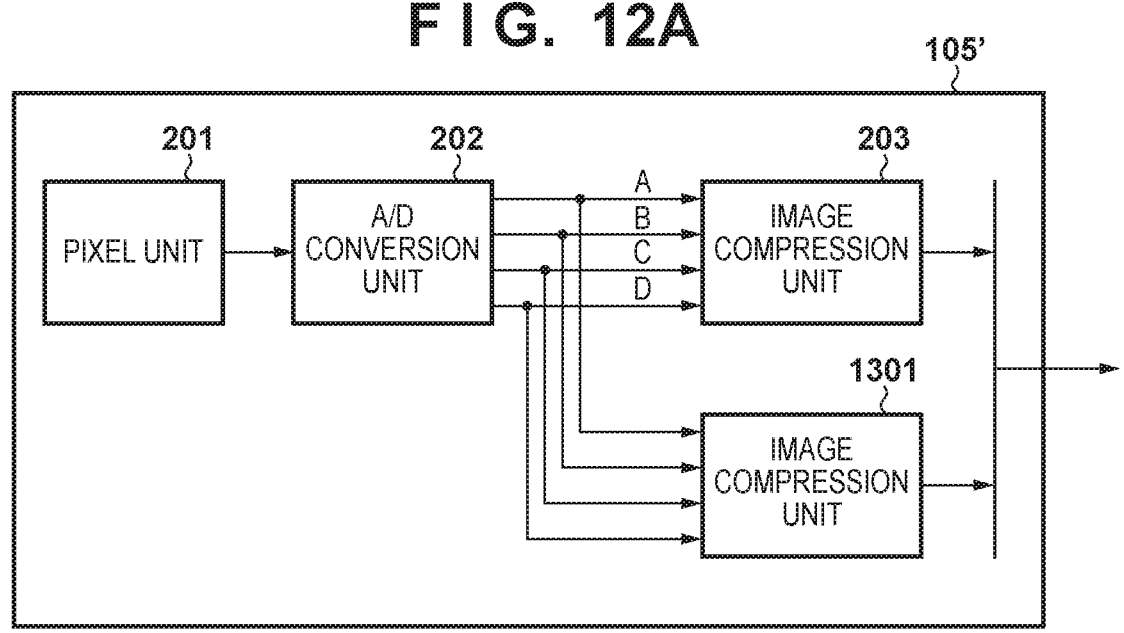
FIGS. 12A and 12B relate to the image capture unit and the image compression unit of the digital camera according to a second embodiment.

FIG. 12A is a block diagram illustrating a functional configuration example of an image capture unit 105' according to this embodiment, where the same constituent elements as those in FIG. 2A are assigned the same reference numerals. The image capture unit 105' according to this embodiment differs from the image capture unit according to the first embodiment in that a second image compression unit 1301 is additionally provided.

Figure 12B:
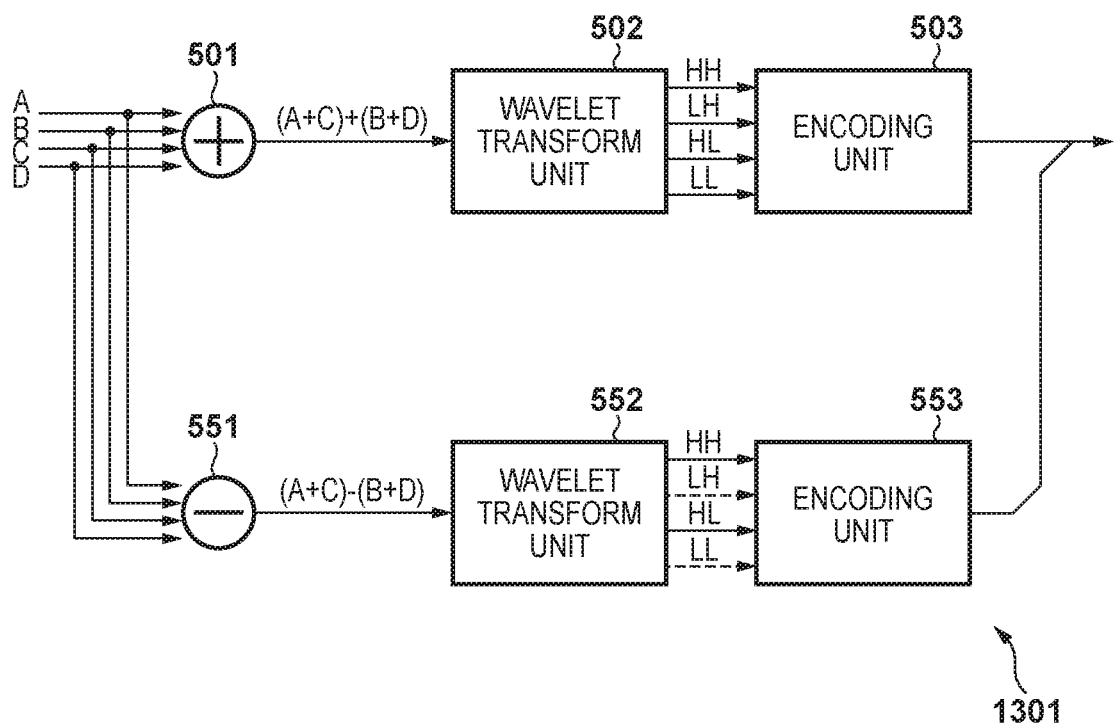

FIG. 12B is a block diagram illustrating a functional configuration example of the added image compression unit 1301, where the same functional blocks as those included in the image compression unit 203 are assigned the same reference numerals as those in FIG. 3.

A subtracter unit 551 generates a difference image obtained by calculating (A+C)−(B+D), and supplies the generated difference image to a wavelet transform unit 552. The wavelet transform unit 552 performs wavelet transform on the difference image, and only supplies the wavelet expansion coefficients to an encoding unit 553. The encoding unit 553 encodes the wavelet expansion coefficients.

The composite image (A+B+C+D) corresponds to (A+C)+(B+D). Accordingly, an image (A+C) and an image (B+D) can be restored using the encoded data of the composite image and the difference image (details will be described later). The images A and C and the images B and D respectively are images formed by signals obtained by two photoelectric conversion units that are vertically arranged within each pixel. Thus, with the configuration of the image capture unit 105' according to this embodiment, encoded data is generated with which a pair of parallax images that are obtained by pupil division only in the horizontal direction can be restored. Information regarding parallax in the vertical direction is lost as a result of this addition, and accordingly the shift direction in the refocusing is limited to the horizontal direction, but the effect of reducing encoded data is enhanced. Accordingly, by selectively using the image compression units 203 and 1301, it is possible to select which of flexibility in refocusing and a reduction in encoded data (an increase in the frame rate or the number of images that can be continuously captured) the priority should be given to.

As a result of the calculation performed by the subtracter unit 551, the wavelet expansion coefficients needed for the difference image are only coefficients relating to the horizontal direction. For this reason, the wavelet transform unit 552 for processing the difference image outputs sub-bands HL and HH that correspond to horizontal wavelet expansion coefficients. Note that, when recording the encoded data to the recording medium 108, the control unit 101 includes, in a header or the like of a data file, information regarding the decomposition level of wavelet transform and sub-bands recorded for the composite image and the difference images.

In this case, if the number of pixels of an original image is 1, the number of encoded data is 1+½, and can be reduced to (1+½)/2=75% compared with the case of encoding two difference images as-is.

The number of encoded data can be reduced to (3+¼)/4=81% in the first embodiment in which pupil division is performed in both the horizontal and vertical directions, whereas the second embodiment can realize a higher reduction rate.

Figure 13A:
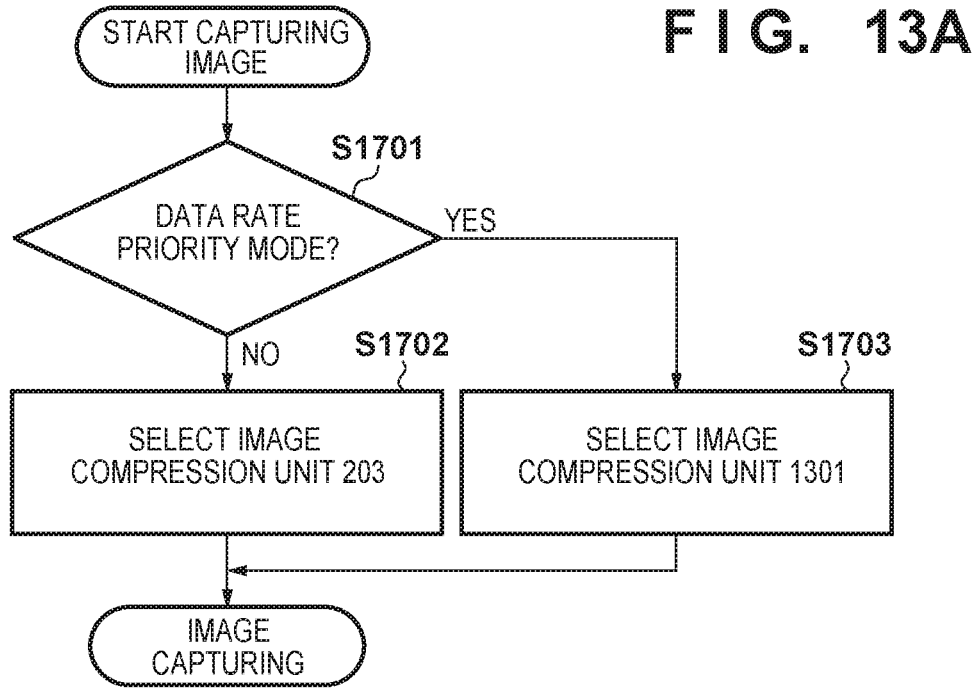
FIGS. 13A and 13B are flowcharts relating to an image capture operation and a refocusing operation according to the second embodiment.

FIG. 13A is a flowchart relating to an operation of the control unit 101 in the case of selectively using the image compression units 203 and 1301 in accordance with mode selection by the user, as an example. The control unit 101 can perform this operation when an operation to input an image capture instruction (e.g. an instruction to start capturing a still image or a moving image) having been made to the operation unit 109 is detected.

In step S1701, the control unit 101 determines whether or not a data rate priority mode has been selected, advances the processing to step S1703 if it is determined that the data rate priority mode has been selected, and advances the processing to step S1702 if not.

In step S1702, the control unit 101 notifies the image capture unit 105' of selecting the image compression unit 203.

In step S1703, the control unit 101 notifies the image capture unit 105' of selecting the image compression unit 1301. Thereafter, the control unit 101 starts image capturing.

During the image capturing, the image capture unit 105' outputs encoded data generated by the image compression unit selected by the control unit 101. Note that the image capture unit 105' may stop the operation of the image compression unit that has not been selected.

Note that whether or not the data rate priority mode has been selected can be determined by referencing the ROM 102, for example. Also, the control unit 101 may perform similar control based on whether or not an image capture mode has been set in which priority is to be given to the data rate.

Figure 14A:
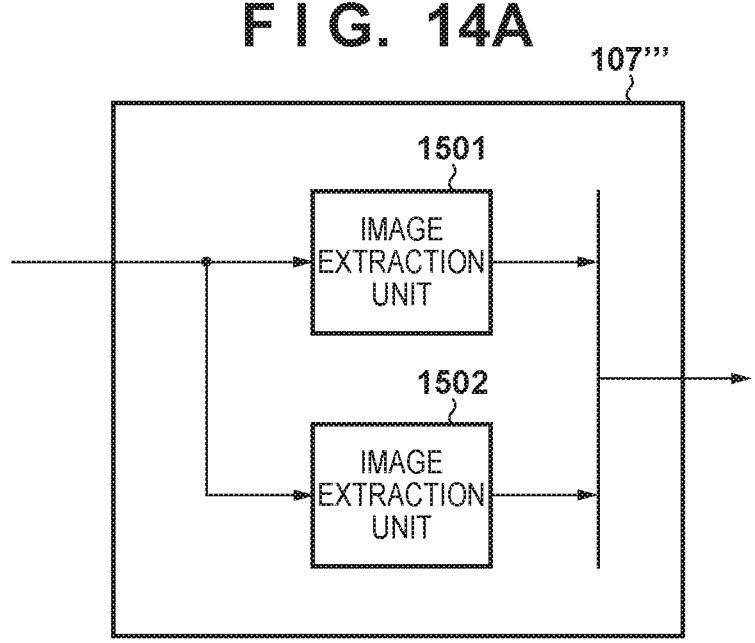
FIGS. 14A and 14B relate to a functional configuration of the image processing unit of the digital camera according to the second embodiment.

FIG. 14A is a block diagram illustrating a functional configuration example of an image processing unit 107''' according to this embodiment. The image processing unit 107''' according to this embodiment includes two image extraction units 1501 and 1502. Here, the image extraction unit 1501 has the same configuration as that of the image processing unit 107 shown in FIG. 6A, and a description thereof is omitted accordingly.

Figure 14B:
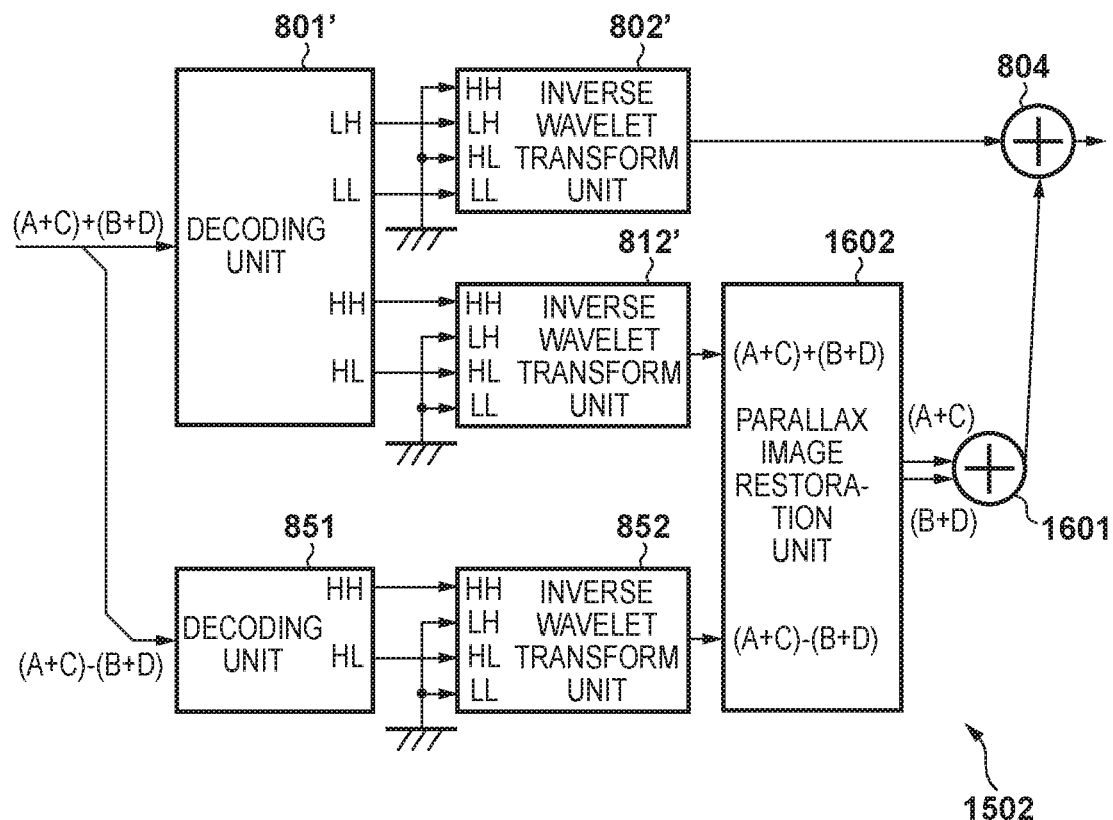

FIG. 14B is a block diagram illustrating a functional configuration example of the image extraction unit 1502. The image extraction unit 1502 extracts encoded data that has been recorded in the data rate priority mode (i.e. generated by the image compression unit 1301).

The decoding unit 801' decodes encoded data of the composite image, supplies the wavelet coefficients for 1LL and 1LH to the inverse wavelet transform unit 802', and supplies the wavelet coefficients for 1HH and 1HL to the inverse wavelet transform unit 812'. The inverse wavelet transform unit 802' performs inverse wavelet transform with the wavelet coefficients for 1HL and 1HH being 0, and outputs the obtained composite image to the adder 804. The inverse wavelet transform unit 812' performs inverse wavelet transform with the wavelet coefficients for 1LL and 1LH being 0, and supplies the obtained composite image (A+B+C+D) to a parallax image restoration unit 1602.

The decoding unit 851 decodes the encoded data of the difference image, and outputs the wavelet coefficients for 1HH and 1HL to the inverse wavelet transform unit 852. The inverse wavelet transform unit 8521 performs inverse wavelet transform with the wavelet coefficients for 1LL and 1LH being 0, and supplies the obtained difference image (A+C)−(B+D) to the parallax image restoration unit 1602.

The parallax image restoration unit 1602 performs calculation expressed by Expressions 17 and 18 below for the composite image (A+B+C+D) and the difference image (A+C)−(B+D), and restores the image (A+C) and the image (B+D), namely two parallax images obtained by displacing the viewpoint in the horizontal direction.

$$A+C=(W+X)/2 \quad \text{(Expression 17)}$$

$$B+D=(W-X)/2 \quad \text{(Expression 18)}$$

Here, W and X are as follows.

$$W=(A+C)+(B+D) \quad \text{(Composite image)}$$

$$X=(A+C)-(B+D) \quad \text{(Difference image)}$$

The parallax image restoration unit 1602 supplies the two restored parallax images to the shift-and-add operation unit 1601. The shift-and-add operation unit 1601 performs a shift-and-add operation on the two parallax images in the horizontal direction, and generates a refocused image.

The adder unit 804 adds the composite image that has been subjected to inverse wavelet transform with only the horizontal scaling coefficients and the refocused image generated using the parallax images that have been subjected to inverse wavelet transform with only the horizontal wavelet expansion coefficients, and generates an ultimate refocused base image.

Figure 13B:
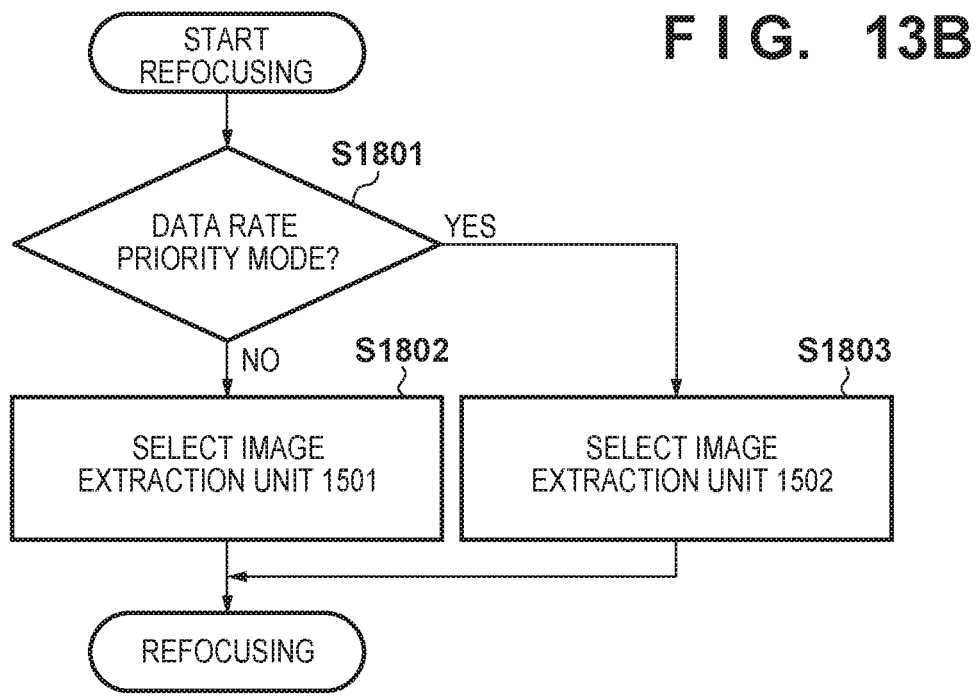

FIG. 13B is a flowchart relating to an operation of the control unit 101 during refocusing. The control unit 101 can perform refocusing, which is an example of processing using parallax images, when an instruction to start refocusing is given through the operation unit 109. In step S1801, the control unit 101 determines whether or not encoded data is recorded in the data rate priority mode, based on header information of a read data file. The control unit 101 advances the processing to step S1803 if it is determined that the encoded data is recorded in the data rate priority mode, and advances the processing to step S1802 if not. In step S1802, the control unit 101 selects the image extraction unit 1501, and notifies the image processing unit 107''' of this selection. In step S1803, the control unit 101 selects the image extraction unit 1502, and notifies the image processing unit 107''' of this selection. Thereafter, the control unit 101 starts refocusing. The image processing unit 107''' outputs an image that is output by the image extraction unit regarding which a notification has been given. Note that the image processing unit 107''' may stop the operation of the image extraction unit that has not been selected. Also, the control unit 101 may also perform the processing in FIG. 13B at another timing, e.g. when loading the encoded data to the RAM 103.

According to this embodiment, it is possible to select whether to perform encoding while reducing the number of difference images, or to perform encoding without reducing the number of parallax images. For this reason, for example, control can be performed so as to reduce the number of difference images when capturing an image of a subject that is moving fast, and to not reduce the number of difference images when capturing a subject that is moving slowly. In other words, it is possible to dynamically switch between giving priority to the use range of parallax images and giving priority to the frame rate or the number of images that can be continuously captured. Note that this switching may be performed based on an explicit instruction given by the user, or may be automatically performed by the image capture apparatus in accordance with subject information detected in a captured image.

Third Embodiment

Next, the third embodiment of the present invention will be described. Note that this embodiment can be carried out by the same functional configuration as that of the digital camera 100 described according to the first embodiment. Thus, the third embodiment will be described using the same reference numerals as those in the first embodiment.

The second embodiment makes it possible to dynamically select whether or not to reduce the number of difference images to be encoded. The third embodiment makes it possible to dynamically change the decomposition level of wavelet transform, using the image compression unit 203'' and the image processing unit 107'' that handle wavelet transform and inverse wavelet transform, respectively, at decomposition levels 1 to 3 described with reference to FIGS. 8 to 11C in the first embodiment. In the following description, an operation to perform wavelet transform at decomposition level m (m=1 to 3) and generate encoded data is called a decomposition level-m transmission mode.

The image compression unit 203'' switches operations of the wavelet transform units 502, 5021, and 5022 and the encoding units 503, 5031, and 5032 included in the respective wavelet transform/encoding units, in accordance with the decomposition level designated by the control unit 101. When loading encoded data to be decoded to the RAM 103, the control unit 101 determines the decomposition level of wavelet transform that has been performed during encoding, based on header information in the encoded data, for example, and notifies the image processing unit 107" of the determined decomposition level. The image processing unit 107" then controls data distribution to the decoding units 801, 8011, and 8021 and the operations of the decoding units 801, 8011, and 8012 and the inverse wavelet transform units 802, 8021, and 8022, in accordance with the determined decomposition level. Note that the determination of the decomposition level of wavelet transform performed during encoding may be performed by the image processing unit 107".

Figure 15A:
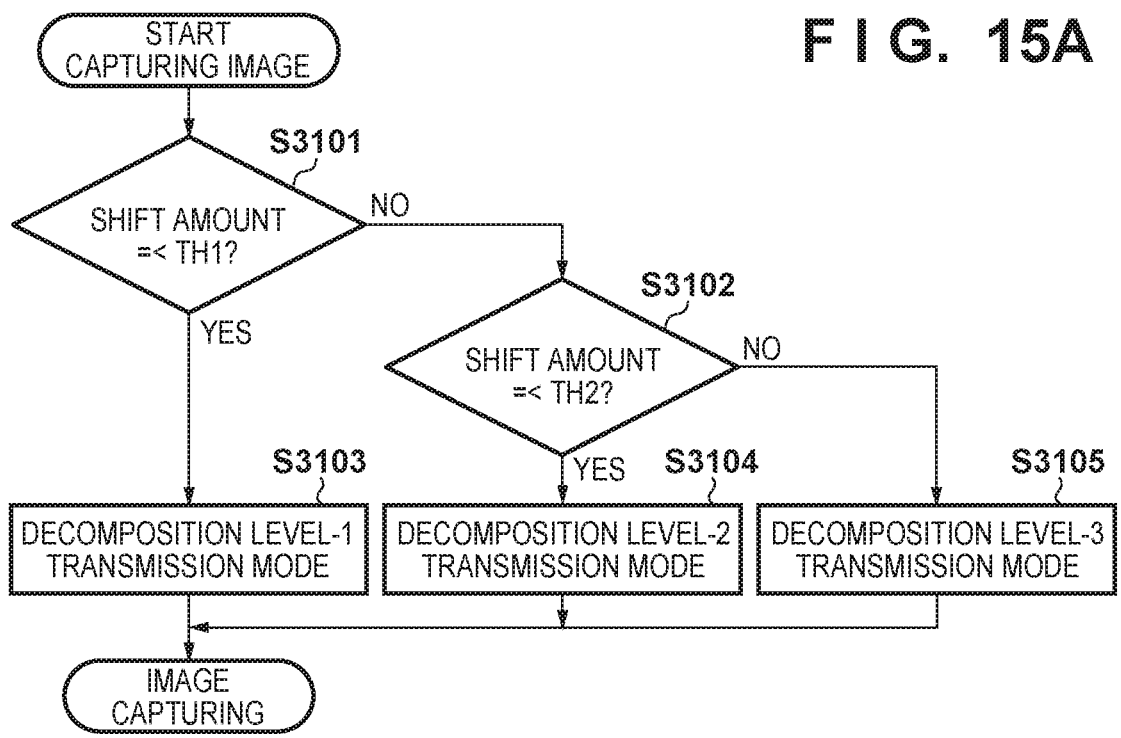
FIGS. 15A and 15B are flowcharts relating to an image capture operation and a refocusing operation according to a third embodiment.

FIG. 15A is a flowchart relating to an operation of the control unit 101 to switch the decomposition level or the transmission mode level in accordance with the setting of the refocusing area, as an example. The control unit 101 can perform this operation when an operation to input an image capture instruction (e.g. an instruction to start capturing a still image or a moving image) having been made to the operation unit 109 is detected. The setting of the refocusing area can be stored in the ROM 102. In this embodiment, the refocusing area is stored as a shift amount, but any set value that is equal to the number of switchable decomposition levels may be stored instead. The method for setting the refocusing area is not particularly limited, and for example, the user may be made to set the refocusing area through a menu screen. In this case, the user may be made to directly set a shift amount, or may be made to select the refocusing area from "large", "medium", and "small".

In step S3101, the control unit 101 determines whether or not the shift amount is smaller than or equal to a threshold TH1. The control unit 101 advances the processing to step S3103 if it is determined that the shift amount is smaller than or equal to the threshold TH1, and advances the processing to step S3102 if not.

In step S3102, the control unit 101 determines whether or not the shift amount is smaller than or equal to a threshold TH2 (TH2>TH1). The control unit 101 advances the processing to step S3104 if it is determined that the shift amount is smaller than or equal to the threshold TH2, and advances the processing to step S3105 if not.

The thresholds TH1 and TH2 can be determined in advance in accordance with the relationship between the decomposition level of wavelet transform and the refocusable area, and can be stored in the ROM 102. In the case where the shift amount may be small, and the refocusing area may be narrow, the decomposition level of the wavelet expansion coefficients for the parallax images can be lowered. This configuration makes it possible to efficiently reduce encoded data in accordance with the refocusing amount needed.

In step S3103, the control unit 101 selects the level-1 transmission mode (wavelet decomposition level 1), and notifies the image capture unit 105 of this selection. Similarly, the control unit 101 selects the level-2 transmission mode (wavelet decomposition level 2) in step S3104, selects the level-3 transmission mode (wavelet decomposition level 3) in step S3105, and notifies the image capture unit 105 of this selection. Thereafter, the control unit 101 starts image capturing. During the image capturing, the image capture unit 105 (image compression unit 203") outputs encoded data corresponding to the transmission mode (decomposition level) selected by the control unit 101.

Figure 15B:
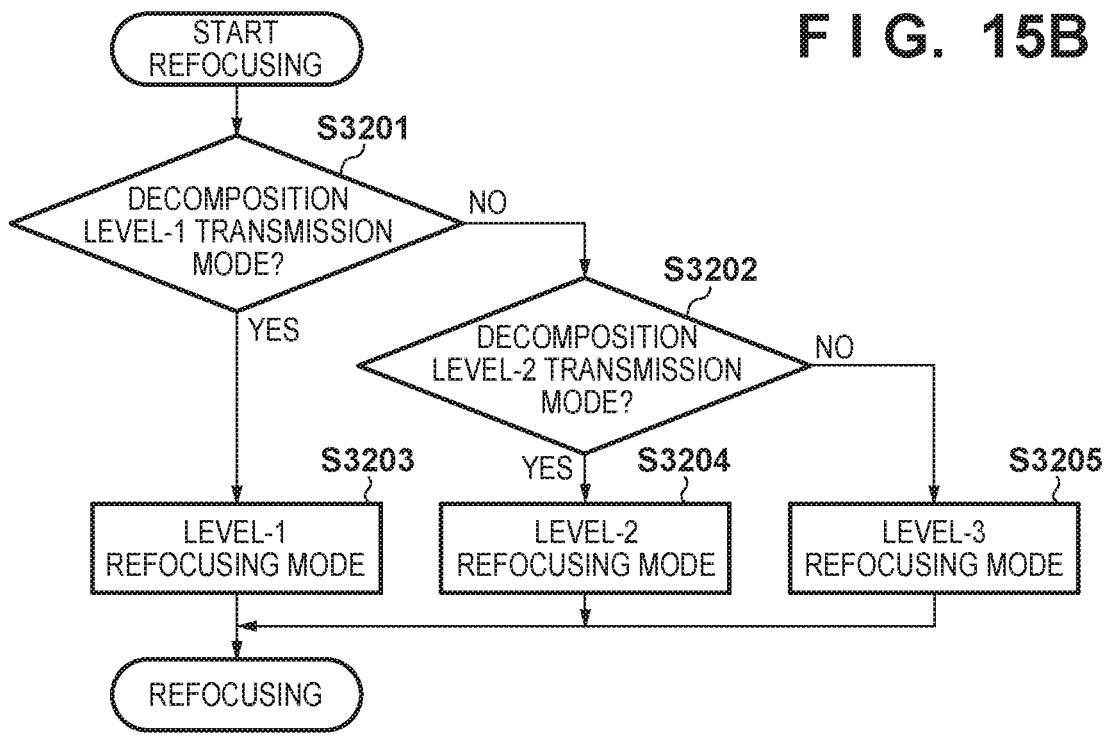

FIG. 15B is a flowchart relating to an operation of the control unit 101 during refocusing. The control unit 101 can perform refocusing, which is an example of processing using parallax images, when an instruction to start refocusing is given through the operation unit 109. In step S3201, the control unit 101 determines whether or not the decomposition level of encoded coefficients is 1, based on header information of a read data file. The control unit 101 advances the processing to step S3203 if it is determined that decomposition level is 1, and advances the processing to step S3202 if not.

In step S3202, the control unit 101 determines whether or not the decomposition level of the encoded coefficients is 2. The control unit 101 advances the processing to step S3204 if it is determined that decomposition level is 2, and advances the processing to step S3205 if not.

In steps S3203 to S3205, the control unit 101 sets the level of the refocusing mode to level 1 to level 3, respectively, and starts refocusing corresponding to the refocusing mode (e.g. displays a GUI for designating a refocusing position on the display unit 110). Here, the refocusing mode corresponds to the upper limit of the refocusing amount, and the upper limit of the refocusing amount at level 1 is the smallest. That is to say, the distance range in which the focus can be changed is narrow.

During subsequent refocusing, the control unit 101 can accept a refocusing instruction from the user in the range corresponding to the set refocusing mode, for example. For example, when a position is designated in the composite image displayed on the display unit 110, the control unit 101 can determine whether or not a refocused image in which the designated position comes into focus can be generated, within the range of the shift amount that corresponds to the current refocusing mode. If it is determined that refocusing cannot be performed on the designated position within the range of the shift amount that corresponds to the refocusing mode, the control unit 101 can warn the user by, for example, displaying a message on the display unit 110.

A configuration can also be employed in which the transmission mode is selected based on conditions other than the shift amount. For example, a configuration is possible in which the depth of field is calculated based on the F-number, magnification, or the like, and the transmission mode at a lower (higher) decomposition level is selected as the depth of field is larger (smaller).

Figure 16:
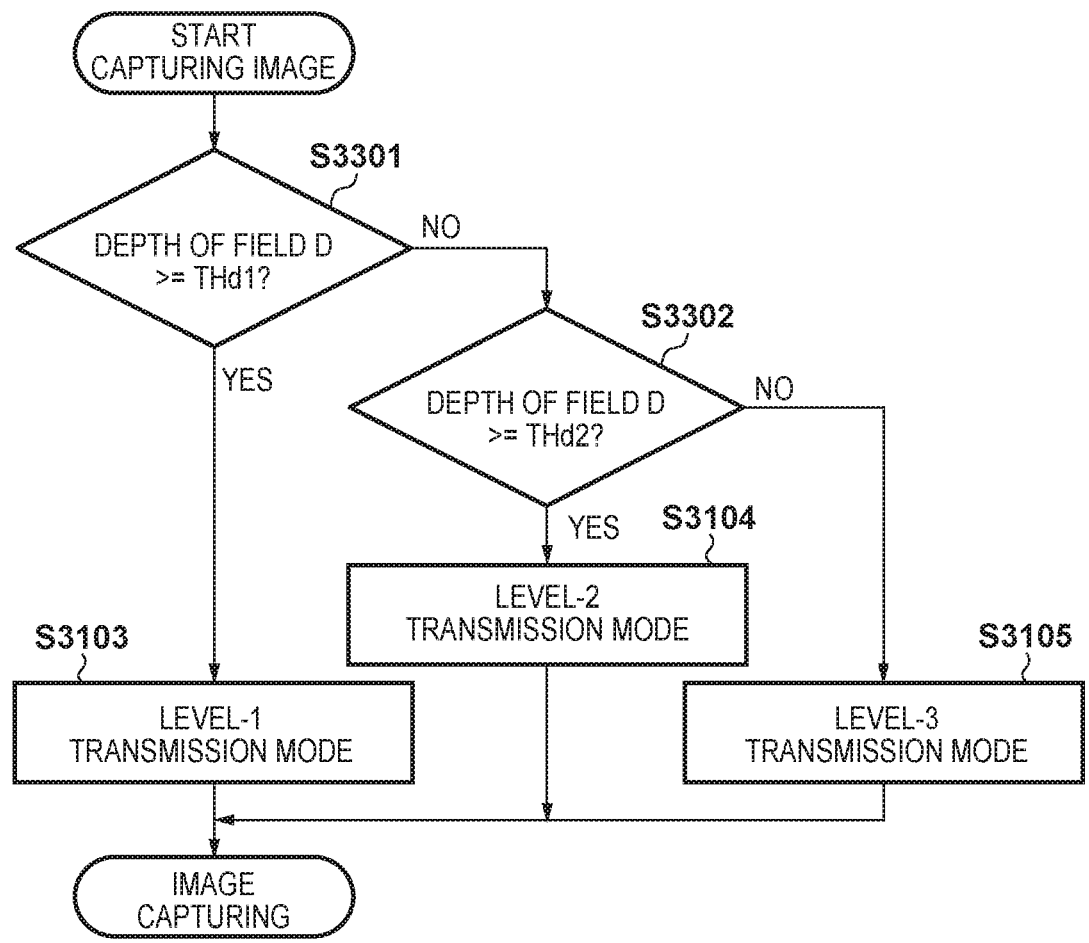
FIG. 16 is a flowchart relating to an image capture operation according to the third embodiment.

In this case, the above-described operation in FIG. 15A need only be changed as illustrated in FIG. 16.

That is to say, in step S3301, the control unit 101 determines whether or not the depth of field D is greater than or equal to a threshold THd1. The control unit 101 advances the processing to step S3103 if it is determined that the depth of field D is greater than or equal to the threshold THd1, and advances the processing to step S3302 if not.

In step S3302, the control unit 101 determines whether or not the depth of field D is greater than or equal to a threshold THd2 (THd2<THd1). The control unit 101 advances the processing to step S3104 if it is determined that the depth of field D is greater than the threshold THd2, and advances the processing to step S3105 if not.

The thresholds THd1 and THd2 can be determined in advance in accordance with the relationship between the decomposition level of wavelet transform and the refocusable area, and can be stored in the ROM 102. If the depth of field is large, the parallax between parallax images is small, and the refocusable area is narrow. Accordingly, the decomposition level of the wavelet expansion coefficients for the difference images can be lowered. This configuration makes it possible to efficiently reduce encoded data in accordance with the refocusing amount needed. Processing in steps S3103 to S3105 is the same as that in FIG. 15A, and a description thereof is omitted accordingly. This configuration makes it possible to efficiently reduce encoded data in accordance with the depth of field.

According to this embodiment, the decomposition level of sub-band division can be dynamically changed. As a result, the decomposition level can be restrained from unnecessarily increasing, and the computational costs and the amount of encoded data can be reduced appropriately.

Fourth Embodiment

Next, the fourth embodiment of the present invention will be described. Note that this embodiment can be carried out by the same functional configuration as that of the digital camera 100 described in the first embodiment. Thus, the fourth embodiment will be described using the same reference numerals as those in the first embodiment.

Figure 17A:
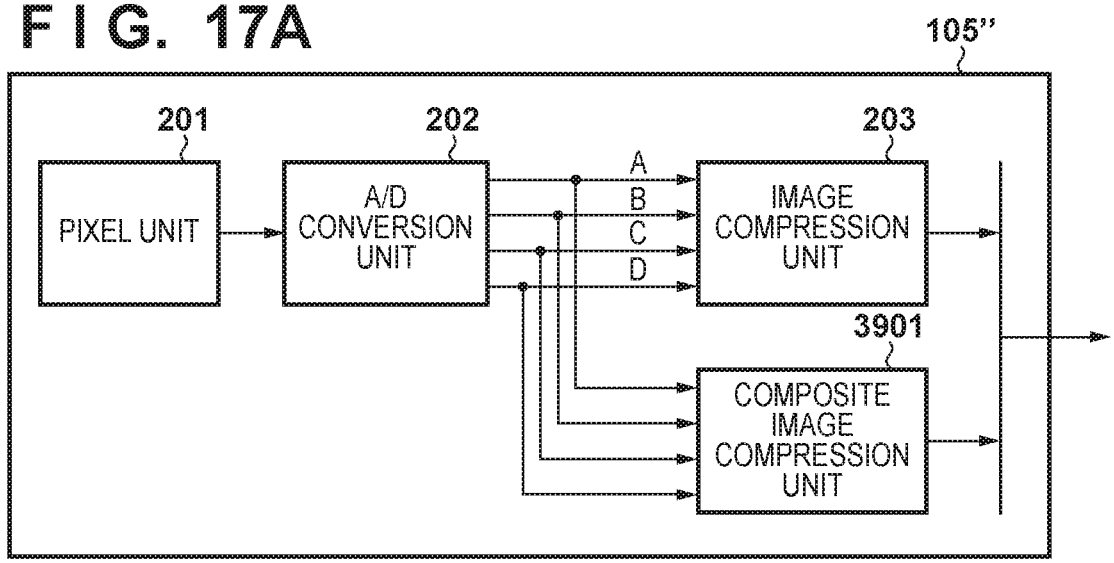
FIGS. 17A to 17C relate to a functional configuration and an operation of the image capture unit of the digital camera according to a fourth embodiment.

FIG. 17A is a block diagram illustrating a functional configuration example of an image capture unit 105" according to this embodiment. The same constituent elements as those in the first embodiment are assigned the same reference numerals as those in FIG. 2A. The image capture unit 105" according to this embodiment has a configuration in which a composite image 3901 is additionally provided in the image capture unit 105 according to the first embodiment.

Figure 17B:
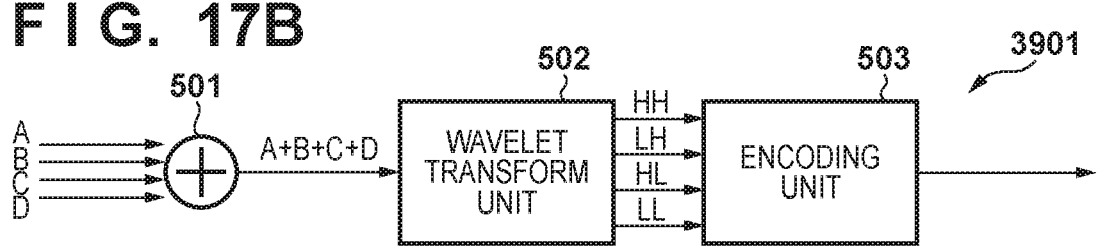

FIG. 17B is a block diagram illustrating a functional configuration example of a composite image compression unit 3901. The composite image compression unit 3901 corresponds to a configuration relating to the composite image, in the configuration of the image compression unit 203 shown in FIG. 3.

Due to the influence of optical aberration of the imaging lens included in the optical system 104, the resolution in a screen peripheral area where the image height is larger is lower than the resolution in a screen center area where the image height is smaller. For this reason, the refocusing effect deteriorates in the screen peripheral area. In this embodiment using such characteristics, encoded data of the difference images is not included but only encoded data of the composite image is included in the screen peripheral area, thereby reducing the amount of encoded data.

Figure 17C:
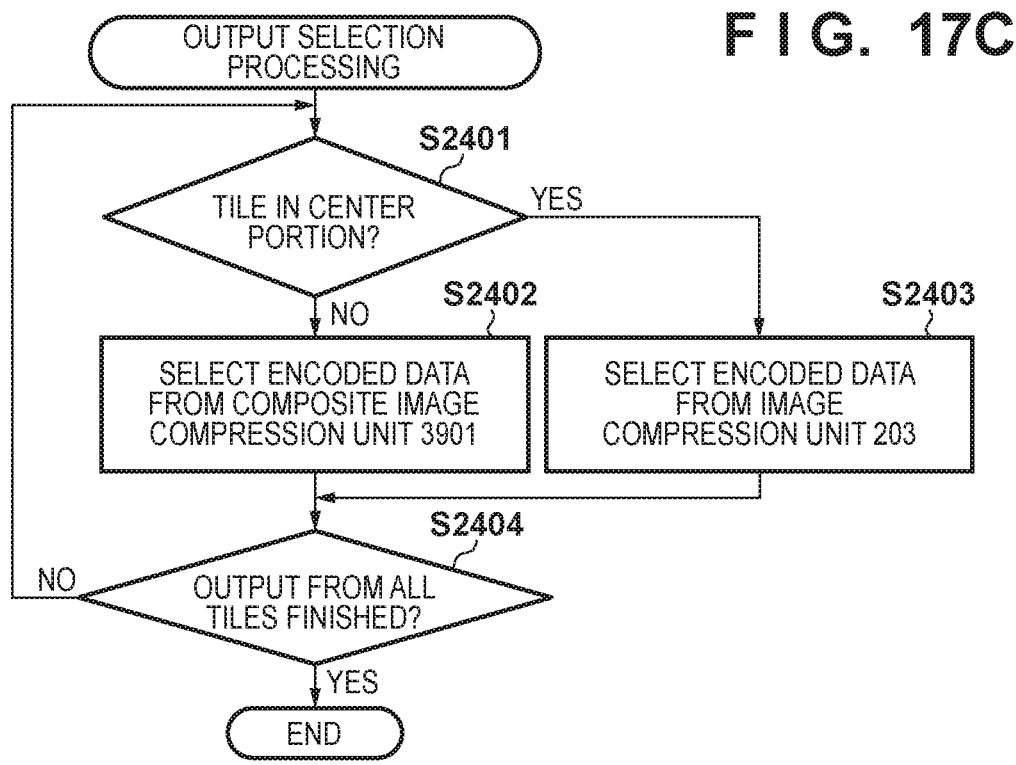

Specifically, while each frame is encoded, the control unit 101 selects encoded data to be output from the image capture unit 105''' as illustrated in the flowchart in FIG. 17C. That is to say, in step S2401, the control unit 101 determines whether or not a tile to be encoded is a tile in a screen center area. Here, "tile" refers to a partial image shown in FIG. 2B, and is an encoding unit. If it is determined that the tile to be encoded is a tile in the screen center area, in step S2403, the control unit 101 instructs the image capture unit 105" to output encoded data generated by the image compression unit 203. Thus, encoded data of both the composite image and difference images is output, as the encoded data of the tile to be encoded, from image capture unit 105".

On the other hand, if it is not determined that the tile to be encoded is a tile in the screen center area (i.e. if it is determined that the tile to be encoded is a tile in an image peripheral area), in step S2402, the control unit 101 instructs the image capture unit 105" to output encoded data generated by the composite image compression unit 3901. Thus, encoded data of only the composite image is output, as encoded data of the tile to be encoded, from the image capture unit 105". Note that encoded data to be output may be switched by the image capture unit 105" in accordance with an instruction from the control unit 101, or may be performed by the control unit 101 directly controlling a switch of the image capture unit 105".

In step S2404, the control unit 101 determines whether or not the encoding of all of the tiles in the current frame have ended, ends the selection processing if it is determined that the encoding of all of the tiles has ended, and returns the processing to step S2401 if not.

Note that tiles to be regarded as tiles in the peripheral area (or center area) can be stored, in advance, in the ROM 102 in accordance with characteristics of the optical system 104. If the optical system 104 is interchangeable, information regarding tiles to be regarded as those in the peripheral area for each type of interchangeable lens can be stored in the ROM 102. Also, when recording encoded data, the control unit 101 includes information that makes it possible to specify, at the time of decoding, which tiles correspond to the screen peripheral area (i.e. whether or not only encoded data of the composite image is recorded), in header information of a file, for example.

Figure 18A:
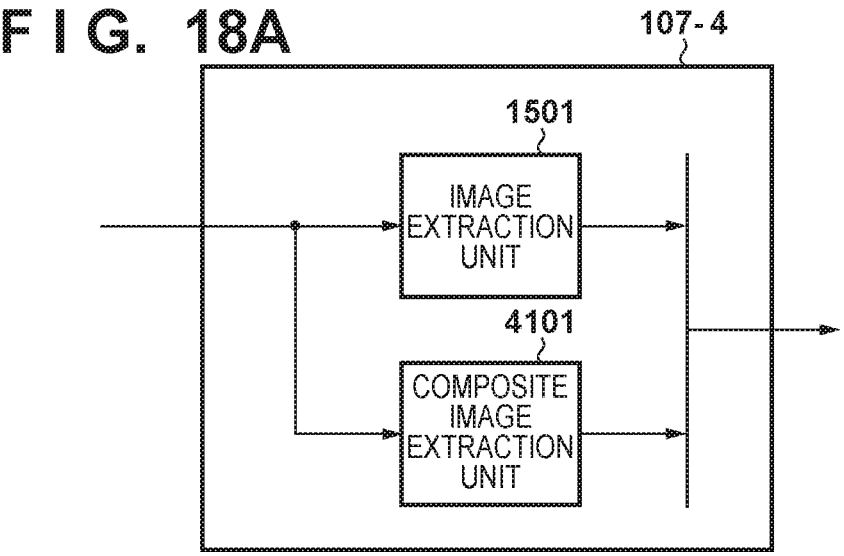
FIGS. 18A to 18C relate to a functional configuration and an operation of the image processing unit of the digital camera according to the fourth embodiment.

FIG. 18A is a block diagram illustrating a functional configuration example of an image processing unit 107-4 according to this embodiment. The same constituent elements as those in the second embodiment are assigned the same reference numerals as those in FIG. 14A. The image processing unit 107-4 according to this embodiment is equal to the image processing unit 107''' according to the second embodiment that includes a composite image extraction unit 4101 in place of the image extraction unit 1502.

Figure 18B:
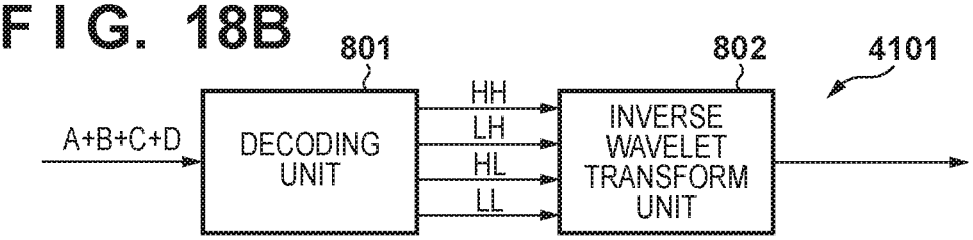

FIG. 18B is a block diagram illustrating a functional configuration example of the composite image extraction unit 4101. The composite image extraction unit 4101 only has the configuration relating to the composite image, out of the configuration of the image processing unit 107 shown in FIG. 6A. However, encoded data of the composite image includes not only the scaling coefficient (LL) but also the wavelet expansion coefficients (LH, HL, and HH), and thus, the decoding unit 801 decodes all of the coefficients and supplies the decoded coefficients to the inverse wavelet transform unit 802. The inverse wavelet transform unit 802 then performs inverse wavelet transform on the coefficients supplied from the decoding unit 801.

Figure 18C:
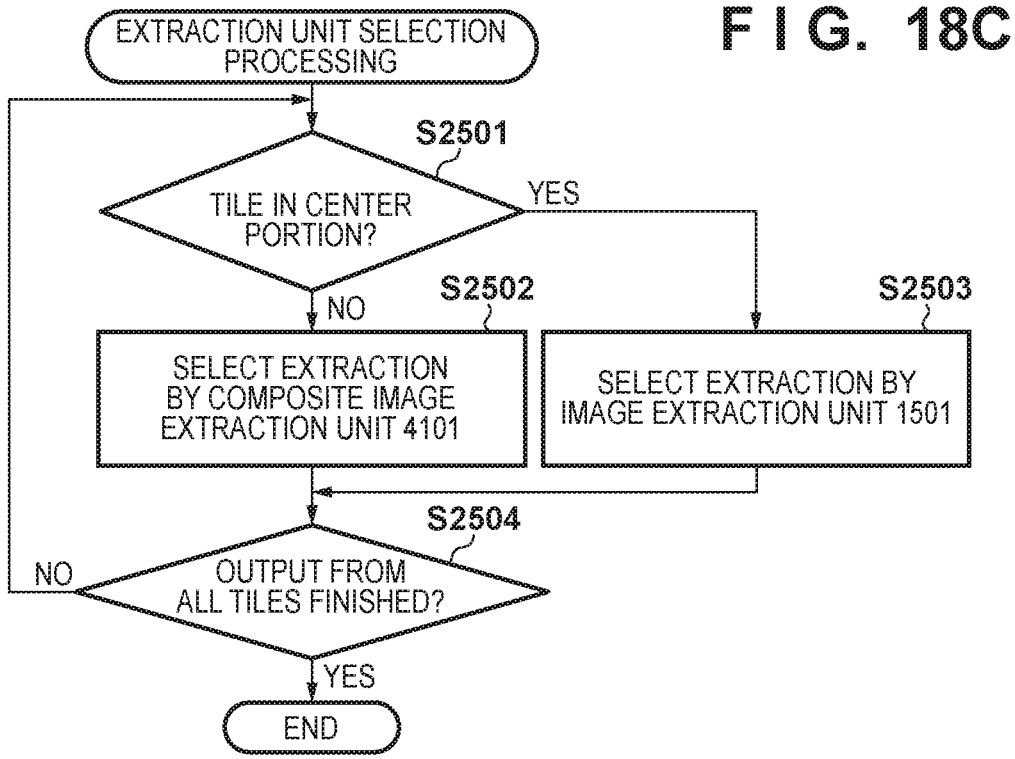

While decoding each frame, the control unit 101 selects the image extraction unit to be used in the image processing unit 107-4, as illustrated in the flowchart in FIG. 18C. That is to say, in step S2501 the control unit 101 determines whether or not a tile to be decoded is a tile in the screen center area. For example, the control unit 101 references header information of a file that includes the encoded data, and thus can determine that the tile to be decoded is a tile in the screen center area (or that the tile to be decoded is not a tile in the image peripheral area). If it is determined that the tile to be decoded is a tile in the screen center area, in step S2503, the control unit 101 instructs the image processing unit 107-4 to output data obtained by the image extraction unit 1501. Thus, data of both the composite image and difference images is output, as the result of decoding the tile to be decoded, from the image processing unit 107-4.

On the other hand, if it is not determined that the tile to be decoded is a tile in the screen center area (i.e. if it is determined that the tile to be decoded is a tile in the image peripheral area), in step S2502, the control unit 101 instructs the image processing unit 107-4 to output decoded data obtained by the composite image extraction unit 4101. Thus, only the data of the base image is output, as the data of the tile to be decoded, from the image processing unit 107-4.

Note that the image extraction unit may be switched by the image processing unit 107-4 in accordance with an instruction from the control unit 101, or may be switched by the control unit 101 directly controlling a switch of the image processing unit 107-4. Otherwise, the above-described processing may be performed by the image processing unit 107-4, rather than the control unit 101, when acquiring the encoded data of the tile to be decoded from the RAM 103.

According to this embodiment, the peripheral areas of difference images are not encoded (otherwise, even if they are encoded, the encoded data is not recorded). As a result, the amount of encoded data of multi-viewpoint images can be reduced, in addition to the effects of the first to third embodiments. Note that the configuration of this embodiment can be combined with the configurations of the first to third embodiments.

Fifth Embodiment

Next, the fifth embodiment of the present invention will be described. Note that this embodiment can be carried out by the same functional configuration as that of the digital camera 100 described in the first embodiment. Thus, the sixth embodiment will be described using the same reference numerals as those in the first embodiment.

Figure 19A:
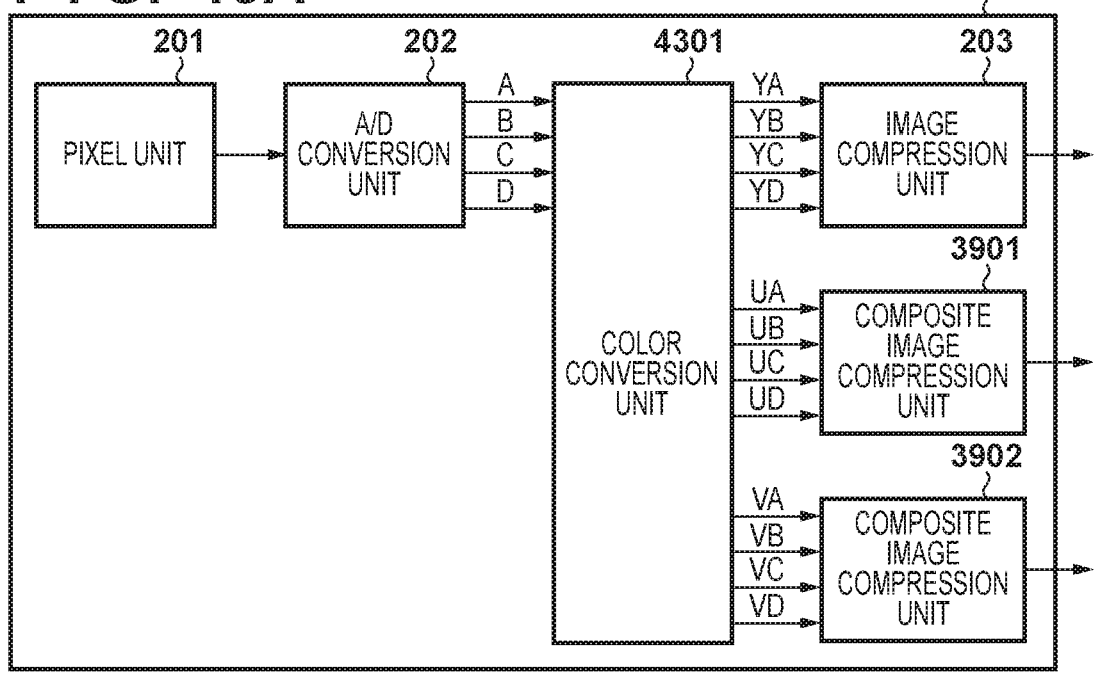
FIGS. 19A and 19B relate to a functional configuration of the image capture unit of the digital camera according to a fifth embodiment.

FIG. 19A is a block diagram illustrating a functional configuration example of an image capture unit 105''' according to this embodiment. The same constituent elements as those in the first embodiment are assigned the same reference numerals as those in FIG. 2A. The image capture unit 105''' according to this embodiment has a configuration in which a color conversion unit 4301 and a composite image compression unit 3902 are additionally provided in the image capture unit 105'' according to the fourth embodiment. Here, the composite image compression unit 3902 has the same configuration as that of the composite image compression unit 3901.

Figure 19B:
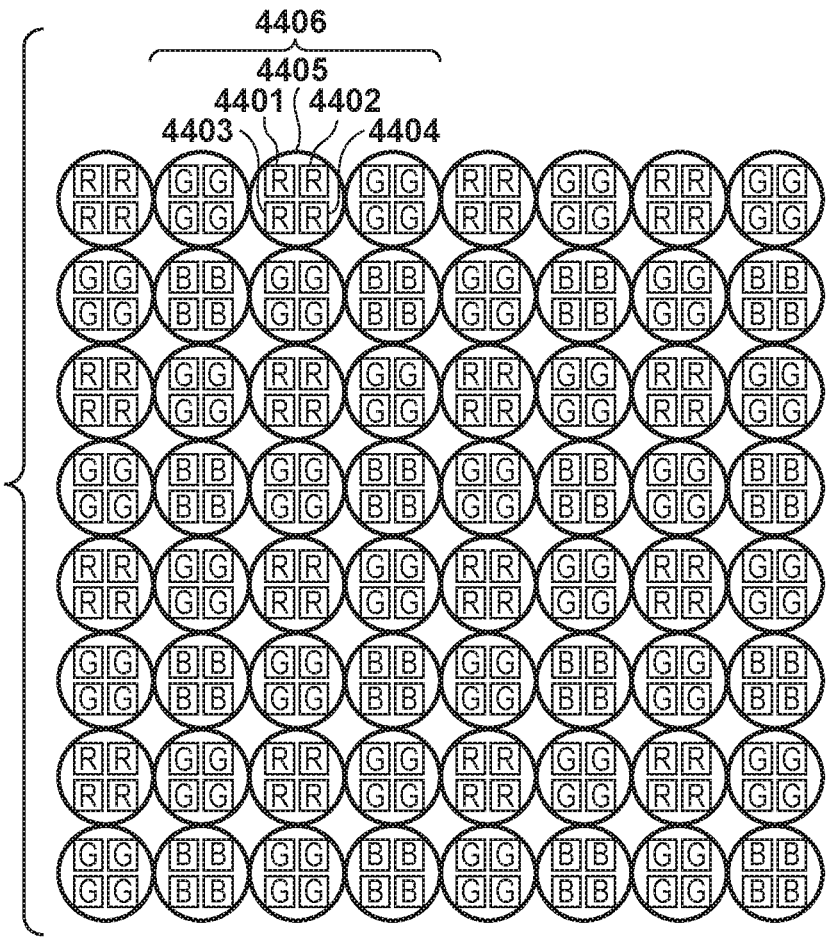

The color conversion unit 4301 converts the format of image data of the images A to D output by the A/D conversion unit 202 from the RGB format to the YUV format. In this embodiment, the pixel unit 201 has a pixel arrangement shown in FIG. 19B. Specifically, the pixel unit 201 has color filters in a primary color Bayer pattern, and each one of the color filters corresponds to one microlens 4405. With this configuration, four photoelectric conversion units 4401, 4402, 4403, and 4404 that share the one microlens 4405 perform photoelectric conversion on a light beam that has passed through a color filter of the same color. Thus, the images A to D are images with a pixel arrangement that is equal to the primary color Bayer pattern.

The color conversion unit 4301 performs debayering (demosaicing) processing on the images A to D so that the respective pixels have RGB components, and then applies known RGB-to-YUV conversion, thereby converting the images A to D to image data in the YUV format. The color conversion unit 4301 then allocates the Y component of the images A to D to the image compression unit 203, the U component to the composite image compression unit 3901, and the V component to the composite image compression unit 3902.

The visual sense of human eyes is less sensitive to color difference components (U and V components), than to the luminance component (Y component). Accordingly, as for the luminance component, the image compression unit 203 performs wavelet transform and encoding, similarly to the first embodiment, on the composite image (YA+YB+YC+YD) and difference images (YA−YB+YC−YD, YA+YB−YC−YD, and YA−YB−YC+YD). That is to say, as for the luminance component, all of the coefficients (LL, HL, LH, and HH) is encoded for the composite image, and the wavelet expansion coefficients (HL, LH, and HH) are encoded for the difference images. On the other hand, as for the color difference components, the composite image compression units 3901 and 3902 perform wavelet transform and encoding, similarly to the fourth embodiment, on only the composite images of the U and V components (UA+UB+UC+UD and VA+VB+VC+VD), respectively. That is to say, as for the color difference components, all of the coefficients of only the composite image are encoded. Thus, encoded data can be reduced by encoding the difference images only for the luminance component regarding which even a small refocusing effect can be readily recognized visually.

Figure 20:
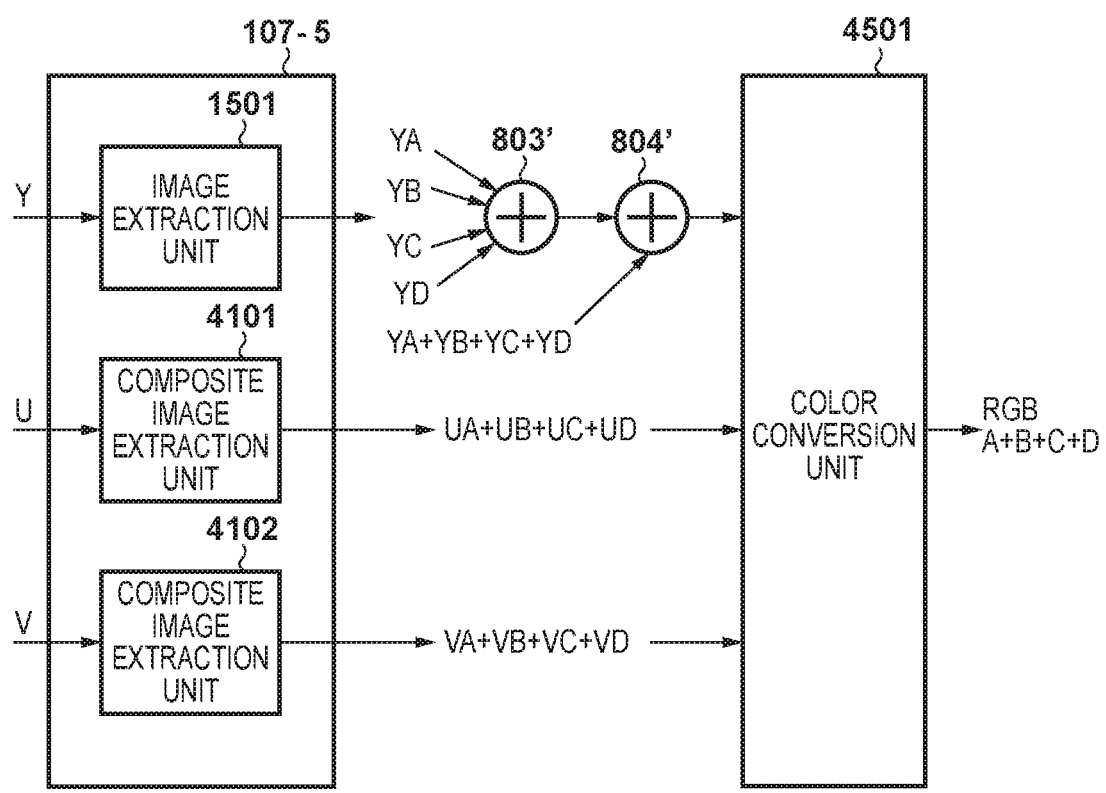
FIG. 20 relates to a functional configuration of the image processing unit of the digital camera according to the fifth embodiment.

FIG. 20 is a block diagram illustrating a functional configuration example of an image processing unit 107-5 according to this embodiment. The image processing unit 107-5 includes a composite image extraction unit 4102, in addition to the image extraction unit 1501 and the composite image extraction unit 4101 that are included in the image processing unit 107-4 shown in FIG. 18A. The composite image extraction unit 4102 has the same configuration as that of the composite image extraction unit 4101. The image extraction unit 1501 performs decoding and inverse wavelet transform on the encoded data of luminance component images (composite image and difference images). The composite image extraction units 4101 and 4102 perform decoding and inverse wavelet transform on the encoded data of the composite images of the U and V components, respectively.

The parallax images (images YA to YD) of the luminance component obtained by the image extraction unit 1501 is subjected to refocusing (shift-and-add operation) by a shift-and-add operation unit 803', and is supplied, as a refocused image, to an adder unit 804'. The adder unit 804' adds the refocused image and the composite image (YA+YB+YC+YD) of the luminance component obtained by the image extraction unit 1501, and supplies the result of addition to the color conversion unit 4501. The color conversion unit 4501 performs color conversion on the luminance component image from the adder unit 804'' and the composite images (UA+UB+UC+UD and VA+VB+VC+VD) of the U and V components obtained by the composite image extraction units 4101 and 4102. Thus, an ultimate refocused image that has the RGB components is obtained.

According to this embodiment, only the luminance component are encoded for a plurality of parallax images (viewpoint images), and the luminance component and the color difference components are encoded for the base image, and accordingly, the amount of encoded data can be efficiently reduced.

Other Embodiments

The above first to fifth embodiments can be partially or entirely combined, as appropriate. The first to fifth embodiments have described configurations in which the image capture unit performs sub-band division, encoding, color conversion, and so on. However, a configuration may alternatively be employed in which the image capture unit performs processing up to A/D conversion, and the control unit or the image processing unit performs sub-band division, encoding, color conversion, and so on. Also, sub-band division, encoding, color conversion, and so on in the first to fifth embodiment may not necessarily be performed when an image is captured. For example, the effect of reducing the recording size can also be achieved by performing such processing to RAW data that is already recorded. The first to fifth embodiments have a configuration in which encoding and decoding are performed by the same apparatus, but encoding and decoding may alternatively be performed by different apparatuses. The present invention is not limited to the configurations in the described embodiments. The configurations in the embodiments can be modified and changed in various manners within the scope described in the claims, and all such modifications and changes are included in the present invention.

The above embodiments have a configuration in which the image compression unit and the pixel units are provided in the same semiconductor chip. However, a configuration may alternatively be employed in which a chip for image capturing that includes a pixel unit and a circuit such as an FPGA (field-programmable gate array) that includes the image compression unit are provided independently, and are electrically connected to each other through wiring. In this case, the output from the image compression unit is directed to an image processing unit that is mounted in yet another chip, for example.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-214187, filed on Nov. 6, 2017, and Japanese Patent Application No. 2018-197848, filed on Oct. 19, 2018, which are hereby incorporated by reference herein in their entirety.

What is claimed is:

1. An image processing apparatus comprising:
a processor that executes a program stored in a memory and functions as:
a dividing unit configured to divide a plurality of difference images that are based on addition and subtraction between a plurality of parallax images, and a composite image that is based on addition of the plurality of parallax images, into a plurality of sub-bands including a sub-band that includes high-frequency components and a sub-band that does not include high-frequency components; and
an encoding unit configured to encode the plurality of difference images and the composite image,
wherein, as for the plurality of difference images, the encoding unit encodes data of the sub-band that includes high-frequency components, and, as for the composite image, the encoding unit encodes data of the plurality of sub-bands.

2. The image processing apparatus according to claim 1, wherein the plurality of difference images are generated so that the plurality of parallax images can be restored by performing addition and subtraction between the plurality of difference images and the composite image.

3. The image processing apparatus according to claim 2, wherein the encoding unit reduces the number of difference images by generating a plurality of difference images that do not have information regarding parallax in a vertical direction or a horizontal direction, using the plurality of parallax images.

4. The image processing apparatus according to claim 1, wherein the encoding unit is switchable between performing encoding while reducing the number of the plurality of difference images and performing encoding without reducing the number of the plurality of difference images.

5. The image processing apparatus according to claim 1, wherein, as for the plurality of difference images, the encoding unit does not encode a predetermined screen peripheral area.

6. The image processing apparatus according to claim 1, wherein the dividing unit can select a level of the division.

7. The image processing apparatus according to claim 6, the processor further functions as:
a control unit configured to select the level of the division performed by the dividing unit,
wherein the control unit selects a first level if a shift amount of the plurality of difference images is a first shift amount, and selects a second level that is higher than the first level if the shift amount of the plurality of difference images is a second shift amount that is larger than the first shift amount.

8. The image processing apparatus according to claim 1, wherein gain of the composite image and the plurality of parallax images is reduced before the encoding.

9. The image processing apparatus according to claim 8, wherein the gain is reduced by performing division on the composite image and the plurality of parallax images.

10. An image processing apparatus comprising:
a processor that executes a program stored in a memory and functions as:
a converting unit configured to convert, to a luminance component and a color difference component, a plurality of difference images that are based on addition and subtraction between a plurality of parallax images, and a composite image that is based on addition of the plurality of parallax images;
a dividing unit configured to divide the luminance component and the color difference component into a plurality of sub-bands including a sub-band that includes high-frequency components and a sub-band that does not include high-frequency components; and an encoding unit configured to encode the plurality of difference images and the composite image, wherein, as for the composite image, the encoding unit encodes data of the plurality of sub-bands of both the luminance component and the color difference component, and as for the plurality of difference images, the encoding unit does not encode the color difference component, and encodes data of the sub-band that include high-frequency components of the luminance component.

11. The image processing apparatus according to claim 10, wherein the dividing unit can select a level of the division.

12. The image processing apparatus according to claim 11, the processor further functions as:

a control unit configured to select the level of the division performed by the dividing unit, wherein the control unit selects a first level if a shift amount of the plurality of difference images is a first shift amount, and selects a second level that is higher than the first level if the shift amount of the plurality of difference images is a second shift amount that is larger than the first shift amount.

13. The image processing apparatus according to claim 12, further comprising:

an optical system; and wherein the control unit selects a first level if a depth of field of the optical system is a first depth of field, and selects a second level that is higher than the first level if the depth of field of the optical system is a second depth of field that is smaller than the first depth of field.

14. The image processing apparatus according to claim 10, wherein gain of the composite image and the plurality of parallax images is reduced before the encoding.

15. The image processing apparatus according to claim 14, wherein the gain is reduced by performing division on the composite image and the plurality of parallax images.

16. An image processing apparatus comprising:

a processor that executes a program stored in a memory and functions as:

an acquisition unit configured to acquire encoded data of a plurality of sub-bands of a composite image that is based on addition between a plurality of parallax images, and encoded data of a sub-band that includes high-frequency components, out of the plurality of sub-bands, of each of a plurality of difference images that are based on addition and subtraction between the plurality of parallax images;

a generating unit configured to generate a refocused image using the plurality of parallax images that have been restored using the encoded data of the plurality of difference images; and an addition unit configured to add the refocused image to the composite image that has been restored using the encoded data of the composite image.

17. The image processing apparatus according to claim 16, wherein the generating unit restores the plurality of difference images, using the encoded data of the plurality of difference images, and the generating unit restores the plurality of parallax images, using the restored composite image and the plurality of difference images.

18. The image processing apparatus according to claim 16, wherein the generating unit generates the refocused image by performing a shift-and-add operation on the plurality of restored parallax images.

19. An image processing apparatus comprising:

a processor that executes a program stored in a memory and functions as:

an acquisition unit configured to acquire encoded data of a plurality of sub-bands of a composite image that is based on addition between a plurality of parallax images, and encoded data of a sub-band that includes high-frequency components, out of the plurality of sub-bands, of each of a plurality of difference images that are based on addition and subtraction between the plurality of parallax images;

a shift-and-add operation unit configured to perform, for each sub-band, a shift-and-add operation on data of sub-bands of the plurality of parallax images that are obtained from the encoded data of the plurality of difference images; and a restoration unit configured to restore an image using data of the sub-bands that has been subjected to the shift-and-add operation and data of the sub-bands obtained from the encoded data of the composite image.

20. An image capture apparatus comprising:

an image sensor that receives a light beam from an optical system and outputs a plurality of parallax images;

an image processing apparatus that applies encoding process to the plurality of parallax images output from the image sensor to generates encoded data; and a recording unit configured to record, to a memory, the encoded data that has been generated by the image processing apparatus, the image processing apparatus comprising:

a processor that executes a program stored in a memory and functions as:

a dividing unit configured to divide a plurality of difference images that are based on addition and subtraction between the plurality of parallax images, and a composite image that is based on addition of the plurality of parallax images, into a plurality of sub-bands including a sub-band that includes high-frequency components and a sub-band that does not include high-frequency components, and an encoding unit configured to encode the plurality of difference images and the composite image, wherein, as for the plurality of difference images, the encoding unit encodes data of the sub-band that includes high-frequency components, and, as for the composite image, the encoding unit encodes data of the plurality of sub-bands.

21. The image capture apparatus according to claim 20, further comprising:

an image processing circuit configured to decode the encoded data that has been generated by the encoding unit and recorded to the memory, and perform image processing using parallax between the plurality of first images.

22. An image capture apparatus comprising:

an image sensor that receives a light beam from an optical system and outputs a plurality of parallax images;

an image processing apparatus that applies an encoding process to the plurality of parallax images to generate encoded data; and a recording unit configured to record, to a memory, the encoded data that has been generated by the image processing apparatus, the image processing apparatus comprising:
a processor that executes a program stored in a memory and functions as:
a converting unit configured to convert, to a luminance component and a color difference component, a plurality of difference images that are based on addition and subtraction between the plurality of parallax images, and a composite image that is based on addition of the plurality of parallax images;
a dividing unit configured to divide the luminance component and the color difference component into a plurality of sub-bands that include a sub-band including high-frequency components and a sub-band that does not include high-frequency components; and
an encoding unit configured to encode the plurality of difference images and the composite image,
wherein, as for the composite image, the encoding unit encodes data of the plurality of sub-bands of both the luminance component and the color difference component, and
as for the plurality of difference images, the encoding unit does not encode the color difference component, and encodes data of the sub-band that includes high-frequency components of the luminance component.

23. The image capture apparatus according to claim 22, further comprising:
an image processing circuit configured to decode the encoded data that has been generated by the encoding unit and recorded to the memory, and perform image processing using parallax between the plurality of parallax images.

24. An image sensor comprising:
a first semiconductor substrate comprising a plurality of photoelectric conversion units that receive a light beam from an optical system and output a plurality of parallax images; and
a second semiconductor substrate comprising the image processing apparatus comprising:
a processor that executes a program stored in a memory and functions as:
a dividing unit configured to divide a plurality of difference images that are based on addition and subtraction between a plurality of parallax images, and a composite image that is based on addition of the plurality of parallax images, into a plurality of sub-bands including a sub-band that includes high-frequency components and a sub-band that does not include high-frequency components; and
an encoding unit configured to encode the plurality of difference images and the composite image,
wherein, as for the plurality of difference images, the encoding unit encodes data of the sub-band that includes high-frequency components, and, as for the composite image, the encoding unit encodes data of the plurality of sub-bands, and
wherein the first semiconductor substrate and the second semiconductor substrate being stacked together.

25. An image processing method to be performed by an image processing apparatus, the method comprising:
dividing a plurality of difference images that are based on addition and subtraction between a plurality of parallax images, and a composite image that is based on addition of the plurality of parallax images, into a plurality of sub-bands including a sub-band that includes high-frequency components and a sub-band that does not include high-frequency components; and
encoding the plurality of difference images and the composite image,
wherein, during the encoding, as for the plurality of difference images, data of the sub-band that includes high-frequency components is encoded, and, as for the composite image, data of the plurality of sub-bands is encoded.

26. An image processing method to be performed by an image processing apparatus, the method comprising:
converting, to a luminance component and a color difference component, a plurality of difference images that are based on addition and subtraction between a plurality of parallax images, and a composite image that is based on addition of the plurality of parallax images;
dividing the luminance component and the color difference component into a plurality of sub-bands including a sub-band that includes high-frequency components and a sub-band that does not include high-frequency components; and
encoding the plurality of difference images and the composite image,
wherein, during the encoding,
as for the composite image, data of the plurality of sub-bands of both the luminance component and the color difference component is encoded, and
as for the plurality of difference images, the color difference component is not encoded, and data of the sub-band that includes high-frequency components of the luminance component is encoded.

27. An image processing method to be performed by an image processing apparatus, the method comprising:
acquiring encoded data of a plurality of sub-bands of a composite image that is based on addition between a plurality of parallax images, and encoded data of a sub-band that includes high-frequency components, out of the plurality of sub-bands, of each of a plurality of difference images that are based on addition and subtraction between the plurality of parallax images;
generating a refocused image using the plurality of parallax images that have been restored using the encoded data of the plurality of difference images; and
adding the refocused image to the composite image that has been restored using the encoded data of the composite image.

28. An image processing method to be performed by an image processing apparatus, the method comprising:
acquiring encoded data of a plurality of sub-bands of a composite image that is based on addition between a plurality of parallax images, and encoded data of a sub-band that includes high-frequency components, out of the plurality of sub-bands, of each of a plurality of difference images that are based on addition and subtraction between the plurality of parallax images;
generating data of sub-bands of the plurality of parallax images, using the encoded data of the plurality of difference images;
performing, for each sub-band, a shift-and-add operation on data of the sub-bands obtained from the encoded data of the composite image; and
restoring an image using the data of the sub-bands that have been subjected to the shift-and-add operation and the data of the sub-bands that are obtained from the encoded data of the composite image.

29. A non-transitory computer-readable medium storing a command that can be executed by a computer, the command, upon being executed by the computer, causing the computer to function as an image processing apparatus comprising:

a dividing unit configured to divide a plurality of difference images that are based on addition and subtraction between a plurality of parallax images, and a composite image that is based on addition of the plurality of parallax images, into a plurality of sub-bands including a sub-band that includes high-frequency components and a sub-band that does not include high-frequency components; and an encoding unit configured to encode the plurality of difference images and the composite image, wherein, as for the encoding unit, the encoding unit encodes data of the sub-band that includes high-frequency components, and, as for the composite image, the encoding unit encodes data of the plurality of sub-bands.

30. A non-transitory computer-readable medium storing a command that can be executed by a computer, the command, upon being executed by the computer, causing the computer to function as an image processing apparatus comprising:

a converting unit configured to convert, to a luminance component and a color difference component, a plurality of difference images that are based on addition and subtraction between a plurality of parallax images, and a composite image that is based on addition of the plurality of parallax images;

a dividing unit configured to divide the luminance component and the color difference component into a plurality of sub-bands including a sub-band that includes high-frequency components and a sub-band that does not include high-frequency components; and an encoding unit configured to encode the plurality of difference images and the composite image, wherein, as for the composite image, the encoding unit encodes data of the plurality of sub-bands of both the luminance component and the color difference component, and as for the plurality of difference image, the encoding unit does not encode the color difference component, and encodes data of the sub-band that includes high-frequency components of the luminance component.

* * * * *